(12) United States Patent
Qing et al.

(10) Patent No.: US 11,776,306 B2
(45) Date of Patent: Oct. 3, 2023

(54) METHOD AND CHIP FOR BIOMETRIC CHARACTERISTIC ACQUISITION, AND COMPUTER READABLE STORAGE MEDIUM

(71) Applicant: Shenzhen Goodix Technology Co., Ltd., Guangdong (CN)

(72) Inventors: Xiaogang Qing, Guangdong (CN); Meng Lv, Guangdong (CN); Chao Yuan, Guangdong (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/848,379

(22) Filed: Jun. 23, 2022

(65) Prior Publication Data
US 2022/0392250 A1    Dec. 8, 2022

Related U.S. Application Data

(63) Continuation of application No. PCT/CN2021/095876, filed on May 25, 2021.

(51) Int. Cl.
*G06F 21/32* (2013.01)
*G06V 40/12* (2022.01)

(52) U.S. Cl.
CPC .......... *G06V 40/1394* (2022.01); *G06F 21/32* (2013.01); *G06V 40/1388* (2022.01)

(58) Field of Classification Search
CPC .......... G06V 40/1394; G06V 40/1388; G06V 10/147; G06V 10/141; G06V 10/60; G06V 40/67; G06V 40/1318; G06F 21/32
See application file for complete search history.

(56) References Cited

U.S. PATENT DOCUMENTS

2015/0113632 A1*  4/2015  Saito ............... G06V 40/172
                                                         726/16
2018/0189540 A1*  7/2018  Chang ............... G06V 40/1318
(Continued)

FOREIGN PATENT DOCUMENTS

CN    104702851 A    6/2015
CN    109005369 A    12/2018
(Continued)

OTHER PUBLICATIONS

Shenzhen Goodix Technology Co., Ltd., Extended European Search Report, EP21904612.5, Feb. 2, 2023, 7 pgs.

*Primary Examiner* — Antonio Xavier
(74) *Attorney, Agent, or Firm* — USCH Law, PC

(57) ABSTRACT

Some embodiments of the present disclosure relate to biometric characteristic detection technology, which provide a method and chip for biometric characteristic acquisition, and a computer readable storage medium. The method for biometric characteristic acquisition includes: acquiring a plurality of configuration parameters, where the plurality of configuration parameters include a first exposure duration, parameters defining a first region and a target photosensitive value, where the first region is a local region in a photosensitive region of the chip for biometric characteristic acquisition; exposing the first region according to the first exposure duration, and acquiring a photosensitive value of the first region; determining a second exposure duration required to acquire the target photosensitive value in the photosensitive region according to the photosensitive value of the first region and the first exposure duration; and acquiring a biometric image according to the second exposure duration.

19 Claims, 7 Drawing Sheets

(56) References Cited

U.S. PATENT DOCUMENTS

| | | | |
|---|---|---|---|
| 2019/0057237 A1* | 2/2019 | Zuo | G06V 40/1359 |
| 2020/0394380 A1 | 12/2020 | Chung et al. | |
| 2021/0075950 A1 | 3/2021 | Han et al. | |
| 2021/0333928 A1* | 10/2021 | Wu | G06V 40/1365 |
| 2022/0027596 A1* | 1/2022 | Lo | H04N 23/73 |

FOREIGN PATENT DOCUMENTS

| | | |
|---|---|---|
| CN | 109496312 A | 3/2019 |
| CN | 110532972 A | 12/2019 |
| CN | 110945526 A | 3/2020 |
| CN | 111586311 A | 8/2020 |
| WO | 2020077490 A1 | 4/2020 |
| WO | 2020155550 A1 | 8/2020 |
| WO | 2020223881 A1 | 11/2020 |

\* cited by examiner

```
1 1 0 0 1 1 1 1
1 1 0 0 0 1 1 1
1 1 0 0 1 1 1 1
1 1 1 1 1 1 1 1
   ......
1 1 1 1 1 1 1 1
```

```
1 1 0 0 1 1 1 1
1 1 0 0 0 1 1 1
1 1 0 0 1 1 1 1
1 1 1 1 1 1 1 1
   ......
1 1 1 1 1 1 1 1
```

METHOD AND CHIP FOR BIOMETRIC CHARACTERISTIC ACQUISITION, AND COMPUTER READABLE STORAGE MEDIUM

CROSS REFERENCE TO RELATED APPLICATIONS

The present application is a continuation of PCT Patent Application No. PCT/CN2021/095876, filed May 25, 2021, which is incorporated by reference herein in its entirety.

TECHNIC FIELD

Embodiments of the present disclosure relate in general to biometric characteristic detection technology, and more specifically to a method and chip for biometric characteristic acquisition, and a computer readable storage medium.

BACKGROUND

In an interactive unlock scheme of a terminal, the biometric technology has become a new interactive technology, and an optical fingerprint recognition technology has become a very convenient and fast fingerprint recognition scheme. The optical fingerprint recognition technology uses under-screen hidden fingerprint design, and the terminal is able to be unlocked by pressing fingers directly on a fingerprint icon area displayed on the screen. More and more mobile phone projects of complete-machine manufacturers support the optical fingerprint recognition function. Screens produced by different manufacturers are also introduced, and the screens produced by different manufacturers vary greatly.

At present, in a calibration phase of the complete machine, a default exposure duration is set for a biometric characteristic acquisition chip in the complete machine. When the complete machine performs biometric image acquisition based on the default exposure duration after leaving the factory, adaptability of the biometric characteristic acquisition chip to the change of the external environment becomes worse due to the change of the external environment, which affects the accuracy of the acquired biometric image and reduces the accuracy rate of subsequent biometric recognition or registration. Taking an under-screen fingerprint acquisition chip in mobile phone as an example, fluctuation of a fingerprint spot easily leads to poor adaptability of the under-screen fingerprint acquisition chip to the fingerprint spot, which affects the accuracy of the acquired fingerprint image and reduces the accuracy rate of subsequent fingerprint recognition or registration.

SUMMARY

Embodiments of the present disclosure are intended to provide a method and chip for biometric characteristic acquisition, and a computer readable storage medium, so that accuracy of the acquired biometric image is improved, and an accuracy rate of subsequent biometric recognition or registration is increased.

In order to solve the above technical problems, embodiments of the present disclosure provide a method for biometric characteristic acquisition, applied at a chip for biometric characteristic acquisition, including: acquiring a plurality of configuration parameters, where the plurality of configuration parameters include a first exposure duration, parameters defining a first region and a target photosensitive value, where the first region is a local region in a photosensitive region of the chip for biometric characteristic acquisition; exposing the first region according to the first exposure duration, and acquiring a photosensitive value of the first region; determining a second exposure duration required to acquire the target photosensitive value in the photosensitive region according to the photosensitive value of the first region and the first exposure duration; and acquiring a biometric image according to the second exposure duration.

Embodiments of the present disclosure further provide a chip for biometric characteristic acquisition including: a processing unit and a storage unit connected to the processing unit, where the storage unit stores instructions executable by the processing unit, and the instructions are executed by the processing unit to enable the processing unit to perform the method for biometric characteristic acquisition described above.

Embodiments of the present disclosure further provide a terminal including the chip for biometric characteristic acquisition described above.

Embodiments of the present disclosure further provide a computer readable storage medium a computer program that, when executed by a processor, causes the processor to perform the method for biometric characteristic acquisition described above.

In the embodiments of the present disclosure, when biometric image acquisition is performed, a local region (i.e., the first region) in the photosensitive region of the chip for biometric characteristic acquisition is locally exposed according to the first exposure duration in the configuration parameters to obtain the photosensitive value of the first region. Considering that there is a preset relationship between the photosensitive value and the exposure duration, the second exposure duration required to acquire the target photosensitive value in the photosensitive region is able to be reasonably and accurately determined according to the photosensitive value of the first region and the first exposure duration. That is, the biometric image is acquired not based on the default exposure duration when the terminal leaves the factory, but based on the second exposure duration obtained in a current environment, so that the acquired biometric image is more accurate. Even if the external environment changes, i.e., the current environment changes compared with the environment in which the chip for biometric characteristic acquisition is located when the default exposure duration is determined, the second exposure duration is able to adapt to the change of the external environment because the second exposure duration is determined in the current environment, so that adaptability of the chip for biometric characteristic acquisition to the external environment becomes better, the influence of the change of the external environment on the acquisition performance is reduced, and the accuracy rate of subsequent biometric recognition or registration is improved. Moreover, since the first region is the local region in the photosensitive region, a speed of local exposure is relatively fast, and a speed of acquiring the biometric image is able to be accelerated to a certain extent, so that the speed of subsequent biometric recognition or registration is accelerated.

BRIEF DESCRIPTION OF THE DRAWINGS

One or more embodiments are described as examples with reference to the corresponding figures in the accompanying drawings, and the examples do not constitute a limitation to the embodiments. Elements with the same reference numer

DETAILED DESCRIPTION OF THE EMBODIMENTS

In order to make the purposes, technical solutions and advantages of the present disclosure clearer, the following describes some embodiments of the present disclosure in detail with reference to the accompanying drawings. Those of ordinary skill in the art should appreciate that, in various embodiments, many technical details are proposed for the reader to better understand the present disclosure. However, the technical solutions claimed in the present disclosure are able to be realized even without these technical details and various changes and modifications based on the following embodiments. The following embodiments are divided for convenience of description, and shall not constitute any limitation on specific implementations of the present disclosure. The various embodiments may be mutually referenced without contradiction.

With rapid development of the terminal industry, the biometric characteristic acquisition technology has been paid more and more attention. The under-screen biometric characteristic acquisition technology is to dispose a chip for biometric characteristic acquisition below a screen, and acquire an image of an external object through the chip for biometric characteristic acquisition, so as to realize subsequent biometric recognition or biometric registration. The biometric recognition may include fingerprint recognition, palmprint recognition, iris recognition, face recognition, and the like. At present, an organic light-emitting diode (OLED) screen and a liquid crystal display (LCD) screen are a self-emitting display screen and a non-self-emitting display screen, respectively, widely used in terminals such as mobile phones and tablet computers. The OLED screen belongs to an organic light emitting device of a current type, which is able to control each display unit (also referred to as a pixel) to separately emit light through a display driving module.

Figure 1:
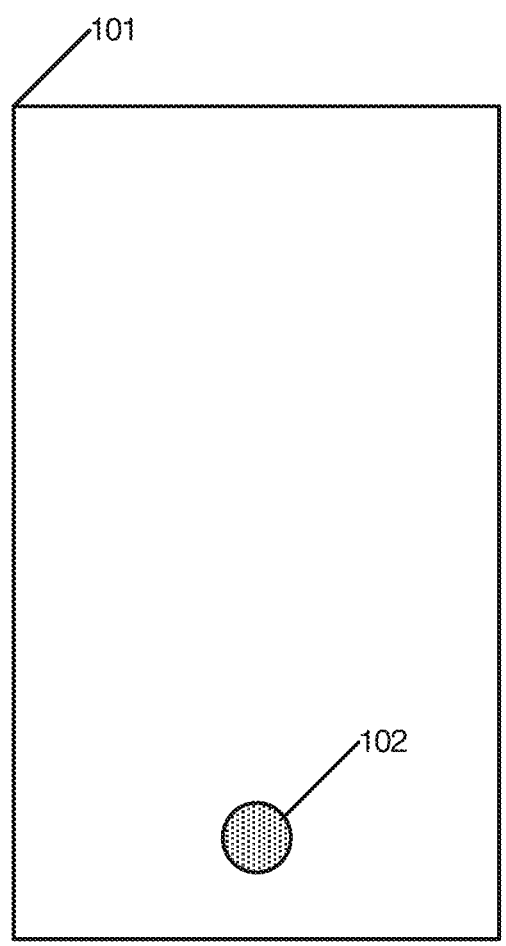
- FIG. 1 is a schematic diagram of a fingerprint spot according to an embodiment of the present disclosure.

Taking fingerprint acquisition as an example, i.e., the chip for biometric characteristic acquisition is a fingerprint acquisition chip. A terminal using the OLED screen is able to realize under-screen optical fingerprint acquisition, and the fingerprint acquisition chip is disposed below the OLED screen, so the fingerprint acquisition chip is also referred to as an under-screen fingerprint acquisition chip, and pixels in the OLED screen are used as a fingerprint excitation light source for screen lighting. Pixels in the OLED screen which are located at a fingerprint detection region (also known as a photosensitive region) are driven to emit light so as to display a fingerprint spot at the fingerprint detection region. Light emitted by the pixels is used as excitation light onto a finger above the OLED screen for fingerprint recognition, and is scattered, reflected or transmitted by the finger to form fingerprint detection light carrying fingerprint information. The fingerprint detection light returns to the OLED screen and is transmitted through the OLED screen to the fingerprint acquisition chip below the OLED screen. The fingerprint acquisition chip receives the fingerprint detection light and converts the fingerprint detection light into a corresponding electrical signal, thereby realizing fingerprint image acquisition. A schematic diagram of the above fingerprint spot is shown in FIG. 1. When a user needs to unlock a terminal 101 or perform other fingerprint identification, it only needs to press a finger on the region where a fingerprint spot 102 is located to realize the fingerprint acquisition, so that fingerprint matching verification is further performed based on the acquired fingerprint image to complete fingerprint recognition.

In related technologies, a terminal having the under-screen fingerprint acquisition chip sets a default exposure duration when leaving the factory based on a calibration result of a complete machine at a mass production stage of the complete machine, and the default exposure duration is stored in the terminal. After the terminal leaves the factory, the user acquires a fingerprint image based on the default exposure duration stored in the terminal when using the terminal for fingerprint registration or fingerprint recognition.

The inventor found that, in the process of the user using the terminal, the accuracy of fingerprint recognition is relatively low if the fingerprint spot fluctuates. The fluctuation of the fingerprint spot may include brightness fluctuation of the fingerprint spot, color temperature fluctuation of the fingerprint spot, etc. Cases where the fluctuation of the fingerprint spot occurs may include that: the default exposure duration is inaccurate due to abnormal fingerprint spot in the calibration phase of the complete machine, and the terminal is in an environment such as wallpaper switching, screen aging, software update, etc. during the user uses the terminal. Through research, the inventor found that the reason why the fluctuation of the fingerprint spot results in low accuracy of the fingerprint identification is that the under-screen fingerprint acquisition chip still acquires the fingerprint image based on the default exposure duration set when the terminal leaves the factory after the terminal leaves the factory and is used by the user, and does not adjust the default exposure duration in the process of using the terminal, which causes poor adaptability of the under-screen fingerprint acquisition chip to the fingerprint spot, thereby resulting in the low accuracy of the fingerprint identification.

In order to solve the problem of poor adaptability of the chip for biometric characteristic acquisition (such as the under-screen fingerprint acquisition chip) to the change of the external environment (such as the fluctuation of the fingerprint spot), which affects the accuracy of the acquired biometric image (such as the fingerprint image), the embodiments of the present disclosure provides a method for biometric characteristic acquisition, which is applied at the chip for biometric characteristic acquisition, including: acquiring a plurality of configuration parameters, wherein the plurality of configuration parameters include a first exposure duration, parameters defining a first region and a target photosensitive value, where the first region is a local region in a photosensitive region of the chip for biometric characteristic acquisition; exposing the first region according to the first exposure duration, and acquiring a photosensitive value of the first region; determining a second exposure duration required to acquire the target photosensitive value in the photosensitive region according to the photosensitive value of the first region and the first exposure duration; and acquiring a biometric image according to the second exposure duration. The application scenario of this embodiment may include a scenario in which biometric image acquisition is required, such as biometric recognition, biometric registration, etc. The biometric recognition and biometric registration may be fingerprint recognition, fingerprint registration, face recognition, face registration, etc. When the chip for biometric characteristic acquisition determines that the biometric characteristic acquisition is required, the biometric characteristic acquisition process in this embodiment is triggered, i.e., the plurality of configuration parameters are acquired.

In the embodiment of the present disclosure, when the chip for biometric characteristic acquisition performs biometric image acquisition, a local region (i.e., the first region) in the photosensitive region of the chip for biometric characteristic acquisition is locally exposed according to the first exposure duration in the configuration parameters to obtain the photosensitive value of the first region. Considering that there is a preset relationship between the photosensitive value and the exposure duration, the second exposure duration required to acquire the target photosensitive value in the photosensitive region is able to be reasonably and accurately determined according to the photosensitive value of the first region and the first exposure duration. That is, the biometric image is acquired not based on the default exposure duration when the terminal leaves the factory, but based on the second exposure duration obtained in a current environment, so that the acquired biometric image is more accurate. Even if the external environment changes, i.e., the current environment changes compared with the environment in which the chip for biometric characteristic acquisition is located when the default exposure duration is determined, the second exposure duration is able to adapt to the change of the external environment because the second exposure duration is determined in the current environment, so that adaptability of the chip for biometric characteristic acquisition to the external environment becomes better, the influence of the change of the external environment on the acquisition performance is reduced, and the accuracy rate of subsequent biometric recognition or registration is improved. Moreover, since the first region is the local region in the photosensitive region, a speed of local exposure is relatively fast, and a speed of acquiring the biometric image is able to be accelerated to a certain extent, so that the speed of subsequent biometric recognition or registration is accelerated.

In one embodiment, the chip for biometric characteristic acquisition is the under-screen fingerprint acquisition chip, and a biometric image acquired by the under-screen fingerprint acquisition chip may be used for the fingerprint recognition or fingerprint registration. For the terminal including the under-screen fingerprint acquisition chip, even if fluctuation of the fingerprint spot occurs on the screen of the terminal in the process of the terminal actually used by the user, a second exposure duration is able to adapt to the fluctuation of the fingerprint spot since the second exposure duration is determined in the case of the fluctuation of the fingerprint spot, so that the under-screen fingerprint acquisition chip has better adaptability to the fingerprint spot, the influence of the fluctuation of the fingerprint spot on the fingerprint recognition performance is reduced, and the accuracy of the fingerprint recognition is improved. In an implementation, the chip for biometric characteristic acquisition may also be an iris characteristic acquisition chip, a palmprint characteristic acquisition chip, a face characteristic acquisition chip, etc.

Figure 2:
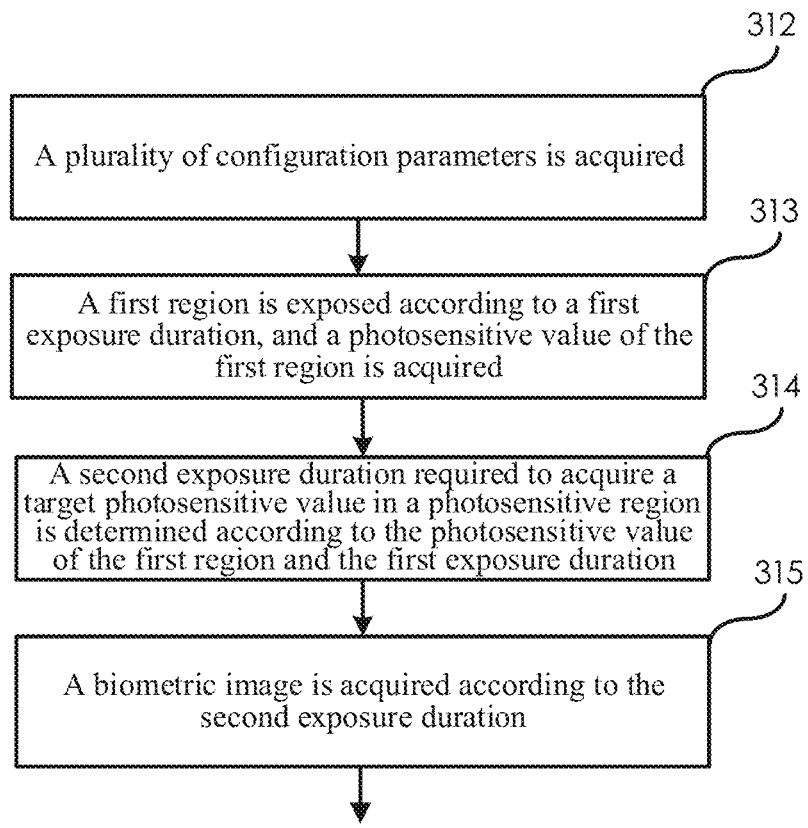
FIG. 2 is a flowchart of a method for biometric characteristic acquisition according to an embodiment of the present disclosure.

In one embodiment, a flowchart of the method for biometric characteristic acquisition may refer to FIG. 2, which includes the following operations.

In 201, a plurality of configuration parameters is acquired.

In 202, a first region is exposed according to a first exposure duration, and a photosensitive value of the first region is acquired.

In 203, a second exposure duration required to acquire a target photosensitive value in a photosensitive region is determined according to the photosensitive value of the first region and the first exposure duration.

In 204, a biometric image is acquired according to the second exposure duration.

The plurality of configuration parameters in operation 201 includes the first exposure duration, parameters defining the first region and the target photosensitive value. The first region is a local region in the photosensitive region of the chip for biometric characteristic acquisition. The configuration parameters may be set in advance by a person skilled in the art according to actual needs.

In one embodiment, operation 201 of acquiring the plurality of configuration parameters further includes the following operation, i.e., the plurality of configuration parameters is acquired in response to detecting a preset trigger condition. The preset trigger condition includes requiring one or both of biometric registration and biometric recognition. That is, the chip for biometric characteristic acquisition acquires the configuration parameters in response to determining that biometric registration and/or biometric recognition are/is required. A manner in which the chip for biometric characteristic acquisition determines that the biometric registration is required may be as follows: the chip for biometric characteristic acquisition receives notification information that the user needs to perform the biometric registration, and the notification information is sent by a processor in the terminal, where the processor may be a central processing unit (CPU), a microprocessor, a coprocessor, or the like in the terminal. The terminal may be a device such as a mobile phone or a tablet computer. A manner in which the chip for biometric characteristic acquisition determines that the biometric recognition is required may be as follows: the chip for biometric characteristic acquisition determines that the terminal needs to be unlocked based on the biometric recognition and needs to make a payment based on the biometric recognition. Alternatively, the preset trigger condition may further include that: the chip for biometric characteristic acquisition acquires the configuration parameters in response to detecting that the chip for biometric characteristic acquisition is enabled.

In one embodiment, operation 201 of acquiring the plurality of configuration parameters further includes the following operation, i.e., internally stored configuration parameters are acquired in response to detecting the preset trigger condition. The configuration parameters may be stored in the chip for biometric characteristic acquisition in advance after being preset, for example, the preset configuration parameters may be written into a register of the chip for biometric characteristic acquisition. That is, the chip for biometric characteristic acquisition is able to acquire the configuration parameters by itself, which is conducive to fast acquisition of the configuration parameters.

In one embodiment, operation 201 of acquiring the plurality of configuration parameters further includes the following operation, i.e., the plurality of configuration parameters delivered by an application software in the terminal are received. The configuration parameters are delivered by the application software, and the chip for biometric characteristic acquisition does not need to store these configuration parameters, which is conducive to saving cost and storage space. Moreover, it is convenient to modify the configuration parameters through the application software according to the actual needs, which improves convenience of modifying the configuration parameters. Alternatively, the configuration parameters delivered by the application software (hereinafter also referred to as a software end) in the terminal are received may further include the following operation, i.e., the configuration parameters delivered by the software end are received in response to detecting the preset trigger condition. For example, the software end may deliver the configuration parameters to the chip for biometric characteristic acquisition in response to detecting the preset trigger condition, and the preset trigger condition has been described above which is not repeated herein. In a specific implementation, the chip for biometric characteristic acquisition may be in a sleep state in a phase of no data acquisition. When the biometric characteristic acquisition is required, the chip for biometric characteristic acquisition is awakened and the software end starts to deliver the configuration parameters.

In one embodiment, after receiving the configuration parameters delivered by the software end, the chip for biometric characteristic acquisition stores the configuration parameters in the register, and when the preset trigger condition is detected again subsequently, the configuration parameters may be acquired the chip for biometric characteristic acquisition directly from the register in the chip for biometric characteristic acquisition without being delivered by the software end each time, thereby improving the convenience of acquiring the configuration parameters.

In one embodiment, the chip for biometric characteristic acquisition is the under-screen fingerprint acquisition chip, and the biometric registration and/or biometric recognition is required includes that it is detected that a region where the fingerprint spot is located on the screen is pressed, and the preset duration is greater than or equal to a minimum duration required for the fingerprint spot from starting being lit to become stable. Operation 201 of acquiring the plurality of configuration parameters further includes the following operation, i.e., the configuration parameters are acquired after an interval of the preset duration in response to detecting that the region where the fingerprint spot is located on the screen is pressed. The minimum duration required for the fingerprint spot from starting being lit to become stable may be obtained by a person skilled in the art through testing according to actual needs, for example, may be set to 40 ms to 50 ms, which is not specifically limited in this embodiment. When it is detected that the region where the fingerprint spot is located on the screen is pressed, it should be understood that the under-screen fingerprint acquisition chip determines that the fingerprint recognition or fingerprint registration is currently required. The configuration parameters are acquired after the interval of the preset duration, which is conducive to ensuring that the under-screen fingerprint acquisition chip acquires the configuration parameters after the fingerprint spot displayed on the screen is stable, and then the second exposure duration is calculated subsequently based on the configuration parameters, so that the second exposure duration is acquired after the fingerprint spot is stable, which improves the accuracy of the acquired second exposure duration, thereby improving the accuracy of the acquired fingerprint image, so as to improve the accuracy of subsequent fingerprint recognition or fingerprint registration.

In one embodiment, in response to detecting that the region where the fingerprint spot is located is pressed, the under-screen fingerprint acquisition chip may send the detected information of being pressed to the software end, and the software end starts timing when receiving the information of being pressed, and sends the configuration parameters to the under-screen fingerprint acquisition chip after timing reaches the preset duration, so that the under-screen fingerprint acquisition chip is able to acquire the configuration parameters after the interval of the preset duration when detecting that the region where the fingerprint spot is located is pressed. The configuration parameters are delivered by the software end, and the under-screen fingerprint acquisition chip does not need to store these configuration parameters, which is conducive to saving cost and storage space. In addition, the software end sends the configuration parameters to the under-screen fingerprint acquisition chip after the interval of the preset duration, so that the second exposure time is acquired after the fingerprint spot is stable, which improves the accuracy of the acquired second exposure duration, thereby improving the accuracy of the acquired fingerprint image, so as to improve the accuracy of subsequent fingerprint recognition or fingerprint registration.

In one embodiment, the under-screen fingerprint acquisition chip may start timing when detecting that the region where the fingerprint spot is located is pressed, and acquire the configuration parameters stored in the register in advance from the register in the under-screen fingerprint acquisition chip after the timing reaches the preset duration, so that the under-screen fingerprint acquisition chip is able to acquire the configuration parameters after the interval of the preset duration in response to detecting that the region where the fingerprint spot is located is pressed. The under-screen fingerprint acquisition chip is able to acquire the configuration parameters by itself without interaction with the software end, which is conducive to fast acquisition of the configuration parameters. In addition, the under-screen fingerprint acquisition chip acquires the configuration parameters after the interval of the preset duration, so that the second exposure duration is acquired after the fingerprint spot is stable, which improves the accuracy of the acquired second exposure duration, thereby improving the accuracy of the acquired fingerprint image, so as to improve the accuracy of subsequent fingerprint recognition or fingerprint registration.

In one embodiment, the first exposure duration (denoted as T1) may be determined according to a linearity of the chip for biometric characteristic acquisition. The smaller the linearity, the smaller the determined first exposure duration. Linearity is an important index to describe the chip for biometric characteristic acquisition. The smaller the linearity, the better the linear characteristic, i.e., the more accurate the linearity. The better the linear characteristic, the shorter T1 is able to be set. The worse the linear characteristic, the longer T1 is able to be set. Through research, the inventor found that the linearity of the chip for biometric characteristic acquisition affects accuracy of light intensity estimated based on the acquired photosensitive value within the same exposure duration, and the accuracy of the estimated light intensity further affects the accuracy of the acquired biometric image. Therefore, in this embodiment, the first exposure duration determined according to the linearity of the chip for biometric characteristic acquisition (the smaller the linearity, the smaller the determined first exposure duration) is conducive to improving the accuracy of the acquired biometric image to a certain extent, thereby improving the accuracy of subsequent biometric recognition or registration.

In one embodiment, the first exposure duration may also be determined based on the linearity of the chip for biometric characteristic acquisition and a preset standard duration for completing the fingerprint recognition. The standard duration required to complete the biometric recognition may also be referred to as a key performance indicator time (KPI time). The KPI time may be set by a person skilled in the art according to actual needs. For example, when a recognition speed is required to be high, the KPI time may be set to be short, when the recognition speed is required to be low, the KPI time may be set to be long, and the KPI time may be set to meet requirements for the recognition speed in different recognition scenarios. The longer the KPI time, the larger the T1 may be set. The shorter the KPI time, the smaller the T1 may be set. Consequently, the KPI time and linear characteristics may be considered together to determine a length of T1, and T1 is greater than 0 ms. Through research, the inventor found that the length of the first exposure time T1 affects the KPI time, and the larger the T1, the greater influence on the recognition speed. Therefore, in this embodiment, the first exposure duration determined according to the KPI time and the linearity of the chip for biometric characteristic acquisition is conducive to balancing the speed and the accuracy of the recognition, so that the accuracy of the recognition is ensured to a certain extent while the biometric recognition is completed within the standard duration.

In one embodiment, the first exposure duration is greater than 0 ms and less than or equal to 10 ms. That is, a value of the first exposure duration T1 is in a range of 0 to 10 ms, and the value of T1 is small, which is conducive to shortening the time for completing biometric characteristic acquisition, thereby shortening the time for subsequent biometric recognition or registration. In a specific implementation, in a certain range (for example, in a range of 0 to 10 ms), the larger the value of T1, the more accurate the determined T2, so that the acquired biometric image is more accurate.

In one embodiment, the first exposure duration T1 is determined according to the KPI time and the linearity of the chip for biometric characteristic acquisition, where 0 ms<T1≤10 ms. That is, the value of T1 is selected from the range of 0 ms to 10 ms according to the KPI time and the linearity of the chip for biometric characteristic acquisition, which is conducive to ensuring that the accuracy of the acquisition is not affected while the speed of the acquisition is as fast as possible.

In one embodiment, the chip for biometric characteristic acquisition is disposed below the screen, an area of the first region is determined according to a structure of the screen, and the structure of the screen includes a soft screen or a hard screen. The area of the first region determined based on the soft screen is larger than the area of the first region determined based on the hard screen. That is, the first region of the soft screen is larger than the first region of the hard screen. Compared with the area of the first region taken by the hard screen, the area of the first region taken by the soft screen is larger because a center of the soft screen collapses. Due to the center of the soft screen collapses, the photosensitive value acquired by at least one pixel located in the center of the soft screen is smaller. Therefore, the larger first region is taken, so that the photosensitive value of the first region is acquired in combination with the photosensitive value acquired by pixels in the larger first region, which is conducive to meeting the requirements of different screen types for the size of the first region and improving the accuracy of the photosensitive value acquired after local exposure.

Figure 3:
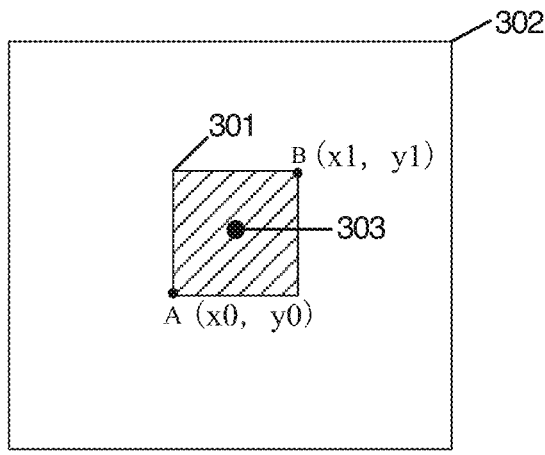
FIG. 3 is a schematic diagram of a relationship between a first region and a photosensitive region according to an embodiment of the present disclosure.

In one embodiment, referring to FIG. 3, a center of a first region 301 is a condensing center 303 of a photosensitive region 302. The condensing center 303 may be understood as a projection point of a center of a lens in the photosensitive region 302, where the lens is assembled with the chip for biometric characteristic acquisition. It is understood that during assembly of the chip for biometric characteristic acquisition with the lens, there may be assembly tolerances such that the center of the lens does not completely coincide with the center of the photosensitive region in the chip for biometric characteristic acquisition in a vertical direction. Therefore, the first region 301 is a region centered around the condensing center of the photosensitive region, and the photosensitive values collected by each pixel in the first region centered around the condensing center are relatively concentrated and have small differences, which is conducive to improving the accuracy of the acquired photosensitive value of the first region. However, in a specific implementation, the center of the first region may also be directly the center of the photosensitive region.

In one embodiment, the area of the first region determined based on the soft screen is larger than the area of the first region determined based on the hard screen, and the centers of the first regions in both the soft screen and the hard screen are the condensing centers of the photosensitive regions in both the soft screen and the hard screen, which is conducive to further improving the accuracy of the acquired photosensitive value of the first region while meeting the requirements of different screen types for the size of the first region.

In a specific implementation, considering that the larger the first region, the more accurate the light intensity detection (but when the first region is large to a certain extent, the accuracy of the light intensity detection does not increase continuously), and the larger the first region, the longer the time required for acquiring the biometric image. Therefore, the size of the first region may be determined by simulation, for example, the size of the first region may be gradually increased in the simulation process, and the accuracy of the light intensity detection after each increase of the first region and the time required for acquiring the biometric image are determined. A compromise value is taken for the first region according to the accuracy of the light intensity detection and the time required for acquiring the biometric image, so that the determined first region not only ensures that the time for acquiring the biometric image is not too long, but also does not affect the accuracy of the light intensity detection too much.

In one embodiment, the number of pixels in the first region is an integer multiple of the number of pixels required to be readout in a mode of one pixel, determined based on an image readout mode 'binning' of the chip for biometric characteristic acquisition. For example, if the image readout mode 'binning' of the chip for biometric characteristic acquisition is 2*2, i.e., the number of pixels required to be readout in the mode of one pixel is four, the number of pixels in the first region is an integer multiple of four. For example, if the image readout mode 'binning' of the chip for biometric characteristic acquisition is 4*4, i.e., the number of pixels required to be readout in the mode of one pixel is sixteen, the number of pixels in the first region is an integer multiple of sixteen. The selection of the first region takes into account the image readout mode 'binning' of the chip for biometric characteristic acquisition itself, which facilitates subsequent processing of pixels in the first region based on the 'binning', thereby facilitating adaptation to the image readout mode of the chip for biometric characteristic acquisition itself, and increasing the speed of image readout, i.e., increasing the speed of biometric image acquisition.

In one embodiment, the first region is a rectangular region, such as the rectangular region 301 in FIG. 3, which may be represented by coordinates (x0, y0), (x1, y1) of two points A, B in the figure. It should be understood that a pixel array including several pixels is distributed in the photosensitive region 302, a pixel A is in row x0, column y0 in the pixel array, and a pixel B is in row x1, column y1 in the pixel array. If the configuration parameter of the first region is delivered by the software end, the software end may directly transmit coordinates of boundary points of the first region, such as the coordinates of the two points A and B in FIG. 3, so as to reduce the amount of data delivered and improve the delivery speed. If the configuration parameter of the first region is stored in the chip for biometric characteristic acquisition in advance, the coordinates of the boundary points of the first region are able to be stored in the chip for biometric characteristic acquisition, so that the amount of stored data is reduced and the storage space is saved.

In one embodiment, the first region may also be represented by mark information of pixels in the entire photosensitive region, for example, all pixels in the first region 301 are marked as 'X', and pixels in addition to the pixels in the first region 301 in the photosensitive region 302 are marked as 'Y'. Pixels in the entire photosensitive region are able to be represented as an array consisting of 'X' and 'Y,' and the region formed by 'X' in the array is the first region 301. If the configuration parameter of the first region is delivered by the software end, the software end may directly send the above array consisting of 'X' and 'Y,' so that the chip for biometric characteristic acquisition is able to clearly distinguish the first region in the photosensitive region according to the received array consisting of 'X' and 'Y.' If the configuration parameter of the first region is stored in the chip for biometric characteristic acquisition in advance, the chip for biometric characteristic acquisition may store the above array consisting of 'X' and 'Y,' so that the chip for biometric characteristic acquisition is able to clearly distinguish the first region in the photosensitive region directly according to the stored array consisting of 'X' and 'Y.'

In one embodiment, the chip for biometric characteristic acquisition is disposed below the screen, the target photosensitive value is determined based on a gain value corresponding to the structure of the screen, the structure of the screen includes the soft screen or the hard screen, and the gain value corresponding to the soft screen is greater than the gain value corresponding to the hard screen. The target photosensitive value is denoted as 'Target', and the gain value is denoted as 'Gain.' 'Gain' may represent an amplification factor of a signal, and 'Gain' and 'Target' have a preset correspondence relationship, which may be set by a person skilled in the art according to actual needs. In a specific implementation, the gain value 'Gain' of the screen may be stored in a register of the chip for biometric characteristic acquisition. In this embodiment, considering that a transmittance of the soft screen is generally lower than a transmittance of the hard screen, the gain value corresponding to the soft screen is set to be greater than the gain value corresponding to the hard screen, which is conducive to ensuring that the soft screen and the hard screen have the same target photosensitive value, and facilitates the processing of the chip for biometric characteristic acquisition, so that the chip for biometric characteristic acquisition is able to maintain a set of algorithms while being compatible with the soft screen and the hard screen, thereby being conducive to improving the compatibility and applicability of the chip for biometric characteristic acquisition.

In operation 202, the photosensitive value of the first region may be understood as the photosensitive value acquired by the pixels located in the first region. Specifically, the photosensitive value of the first region may be the photosensitive value acquired by at least one pixel satisfying a preset condition in the first region. The preset condition may be set according to actual needs. The following describes several forms of the preset condition.

Optionally, the preset condition may be any one of one or more random pixels in the first region, a pixel located at the center of the first region, and all pixels in the first region.

Optionally, the preset condition may be at least one pixel in the first region that does not belong to a bad point. The above bad point may be classified into two main categories. One is a bad point formed due to process limitation, and the other is a pixel (abbreviated as CF point) above which a color filter (CF) is arranged. These two kind of bad points are able to be tested in a complete-machine test phase before leaving the factory, and be stored in the complete machine. The complete machine may be a mobile phone, a tablet computer and other terminals. Considering that the pixel provided with CF may actually only receive red light, green light, or blue light, the pixel provided with CF receives only light of a certain wavelength band as compared with other pixels not provided with CF. Compared with other adjacent pixels not provided with CF, the pixel provided with CF are different in photosensitivity, which may cause some interference on the final acquired biometric image. Therefore, the pixel provided with CF is also regarded as a pixel belonging to the bad point in this embodiment.

When the preset condition is the pixel in the first region that does not belong to the bad point, the configuration parameter further includes, in addition to the first exposure duration, the first region and the target photosensitive value, reference information for determining at least one first type pixel in the first region belonging to the bad point, and the operation 202 of acquiring the photosensitive value of the first region further includes the following operation, i.e., the photosensitive value is acquired according to the reference information by at least one second type pixel in the first region, except for the at least one first type pixel. That is, the chip for biometric characteristic acquisition may acquire the photosensitive value acquired by the pixel in the first region that does not belong to the bad point. The photosensitive value acquired by the bad point is larger than the photosensitive value acquired by a normal pixel, and the photosensitive value acquired by the pixel not belonging to the bad point in the first area is acquired, which is conducive to improving the accuracy of the acquired photosensitive value of the first region, thereby improving the accuracy of the subsequently determined second exposure duration.

Figures 4, 5, 6:
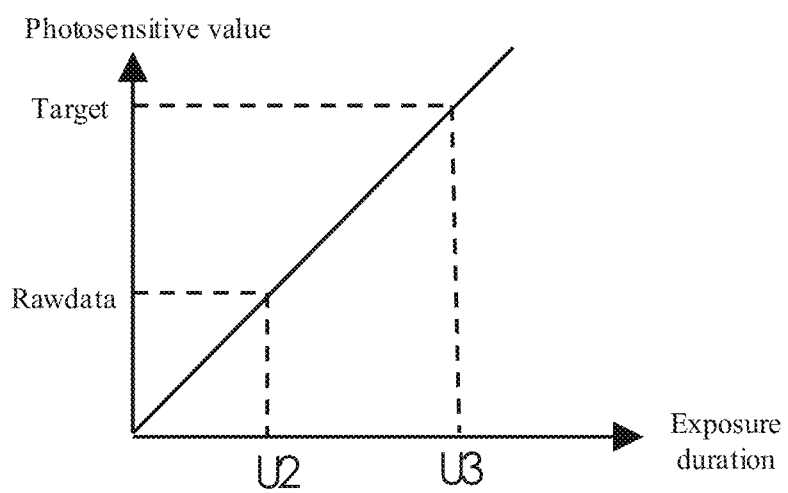
FIG. 4 is a schematic diagram of mark information of each pixel in the first region according to an embodiment of the present disclosure.
FIG. 5 is a schematic diagram of a bad block region in the first region according to an embodiment of the present disclosure.
FIG. 6 is a schematic diagram of a linear relationship between a photosensitive value and an exposure duration according to an embodiment of the present disclosure.
Figure 7:
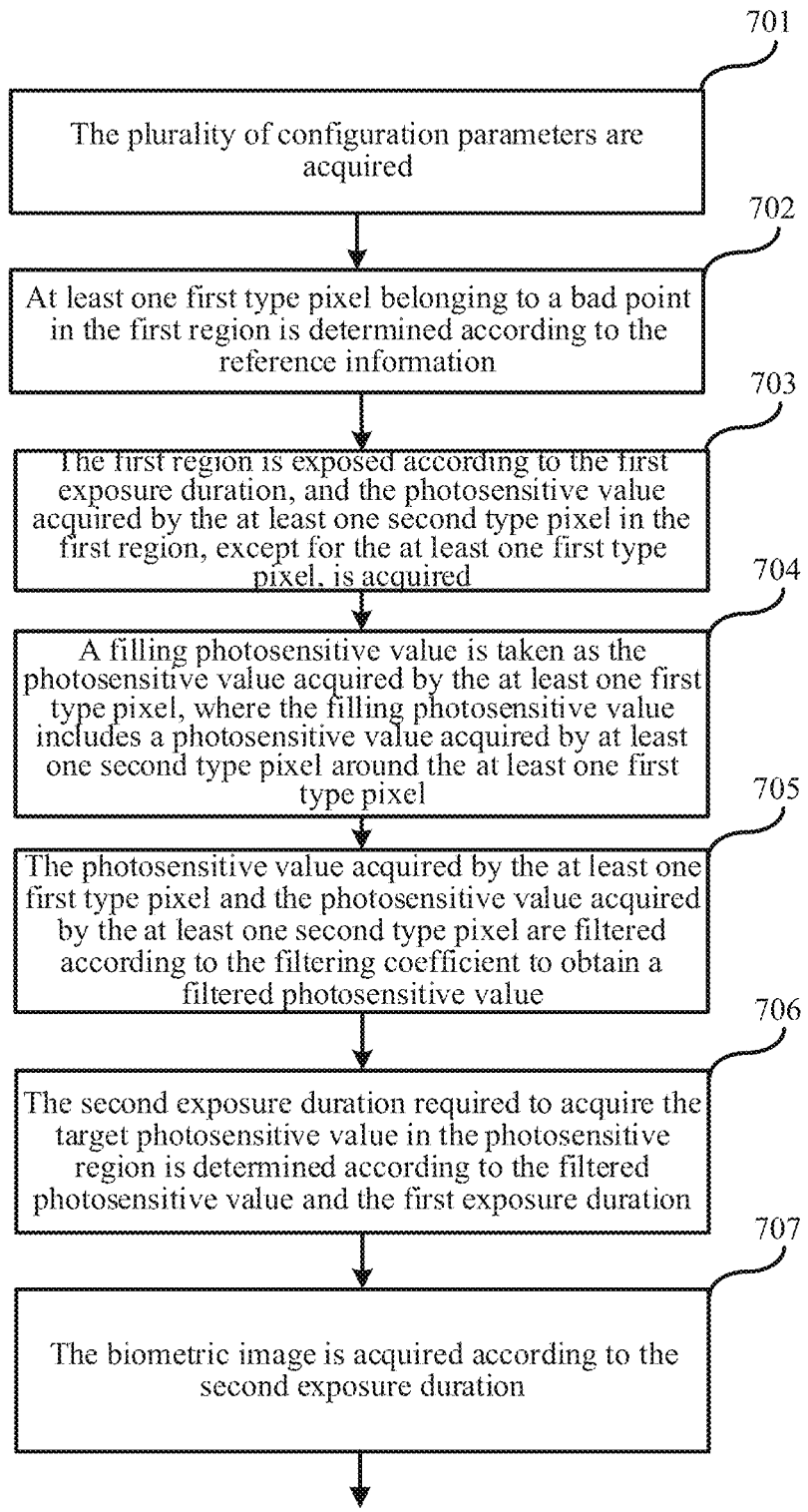
FIG. 7 is a flowchart of another method for biometric characteristic acquisition according to an embodiment of the present disclosure.

In one embodiment, the reference information includes mark information of each pixel in the first region, and the mark information includes first mark information for indicating that the pixel belongs to the bad point and second mark information for indicating that the pixel does not belong to the bad point. The chip for biometric characteristic acquisition determines, according to the reference information, that the at least one first type pixel belonging to the bad point is the pixel marked with the first mark information, and then acquires the photosensitive value acquired by the at least one first type pixel not belonging to the bad point in the first region. The first mark information and the second mark information may be set according to actual needs, for example, the first mark information is labeled as '0,' i.e., the at least one first type pixel belonging to the bad dot is labeled as '0,' and the second mark information is labeled as '1,' i.e., the normal pixel (also referred to as the second type pixel) not belonging to the bad point is labeled as '1.' A schematic diagram of the mark information of each pixel in the first region is shown in FIG. 4. If the configuration parameter of the reference information is delivered by the software end, the software end may directly transmit the mark information of each pixel in the first region, so that the chip for biometric characteristic acquisition is able to directly distinguish whether each pixel belongs to the bad point according to the mark information of each pixel. If the configuration parameter of reference information is stored in the chip for biometric characteristic acquisition in advance, the chip for biometric characteristic acquisition may store the array shown in FIG. 4, so that the chip for biometric characteristic acquisition is able to directly distinguish whether each pixel belongs to the bad point according to the stored array.

In another embodiment, the reference information includes coordinate information of a bad block region determined based on the at least one first type pixel belonging to the bad point, and the chip for biometric characteristic acquisition may determine the at least one first type pixel belonging to the bad point in the first region as the pixel in the bad block region according to the reference information. The bad block region may be the smallest rectangular region formed by the at least one first type pixel belonging to the bad point, so that the coordinate information of the bad block region may be directly represented by the coordinate information of the boundary point of the bad block region, thus the data amount of the reference information is relatively small. For example, a schematic diagram of the bad block region in the first region is shown in FIG. 5. The region indicated by dotted lines in FIG. 5 is the bad block region. It is seen from FIG. 5 that since the bad block region appears as a regular rectangular region, pixels that do not belong to the bad point are allowed to exist in the bad block region, such as two normal pixels labeled as '1' in the bad block region. The chip for biometric characteristic acquisition treats the pixels in the bad block region as the first type pixels belonging to the bad point, and the existence of some normal pixels in the bad block region does not greatly affect the subsequent processing. If the configuration parameter of the reference information is delivered by the software end, the software end may directly transmit the coordinate information of the bad block region, so as to reduce the amount of delivered data and improve the delivery speed. If the configuration parameter of the reference information is stored in the chip for biometric characteristic acquisition in advance, the chip for biometric characteristic acquisition is able to store the coordinate information of the bad block region, so as to reduce the amount of stored data and save the storage space.

In one embodiment, operation 202 may include the following operations, i.e., the chip for biometric characteristic acquisition exposes the first region according to the first exposure duration after an interval of a preset duration in response to detecting the preset trigger condition, and acquires the photosensitive value of the first region. Local exposure is performed after the interval of the preset duration, which is conducive to ensuring that the chip for biometric characteristic acquisition is able to be in a relatively stable state during the local exposure, so that the second exposure period is acquired in a relatively stable state, which improves the accuracy of the acquired second exposure period, thereby improving the accuracy of the acquired biometric image.

For example, the chip for biometric characteristic acquisition is the under-screen fingerprint acquisition chip. When the under-screen fingerprint acquisition chip detects that the region where the fingerprint spot is located on the screen is pressed, the configuration parameter may be first acquired, the first region is exposed according to the first exposure duration after the interval of the preset duration in response to detecting that the region where the fingerprint spot is located on the screen is pressed, and the photosensitive value of the first area is acquired. After the region where the fingerprint spot is located on the screen is pressed, the fingerprint spot starts to be lit, and the fingerprint spot is defaulted to be stable after the interval of the preset duration, i.e., the first region is exposed after the fingerprint spot is stable. In a specific implementation, the under-screen fingerprint acquisition chip may also start to acquire the configuration parameter after the interval of the preset duration in response to detecting that the region where the fingerprint spot is located on the screen is pressed, and then perform the operation of exposing the first region.

In operation 203, considering that there is a preset relationship between the photosensitive value and the exposure duration, the second exposure duration required for acquiring the target photosensitive value in the photosensitive region may be determined in combination with the preset relationship, and the preset relationship may be a linear relationship between the photosensitive value and the exposure duration. For example, referring to the linear relationship between the photosensitive value and the exposure duration in FIG. 6, the second exposure duration T2 may be calculated by combining the linear relationship, the photosensitive value 'Rawdata' of the first region, the target photosensitive value 'Target' and the first exposure duration T1.

In one embodiment, if the photosensitive value of the first region acquired in operation 202 is the photosensitive value acquired by a pixel satisfying the preset condition, the chip for biometric characteristic acquisition may directly take the photosensitive value acquired by the pixel satisfying the preset condition as the photosensitive value of the first region (denoted as 'Rawdata'), and then calculate T2 according to 'Rawdata,' T1, 'Target,' and the linear relationship shown in FIG. 6.

In one embodiment, if the photosensitive value of the first region acquired in operation 202 relates to photosensitive values acquired by a plurality of pixels satisfying the preset condition, the chip for biometric characteristic acquisition may sort the photosensitive values acquired by the plurality of pixels satisfying the preset condition from small to large, and select one photosensitive value within a preset range as the photosensitive value of the first region according to the order of the photosensitive values. Then, T2 is calculated based on the selected photosensitive value, T1, 'Target', and the linear relationship shown in FIG. 6. The preset range does not include photosensitive values arranged in first N bits, nor does it include photosensitive values arranged in last N bits, where N is an integer greater than 1, and a specific value of N may be set by a person skilled in the art according to actual needs, which is not specifically limited in this embodiment. Considering that all of the photosensitive values arranged in the first N bits and the photosensitive values arranged in the last N bits may belong to abnormal photosensitive values, selecting one photosensitive value within the preset range as the photosensitive value of the first region avoids interference of the abnormal photosensitive values to the photosensitive value of the first region, which improves the accuracy of the determined photosensitive value of the first region, thereby improving the accuracy of the calculated T2.

In one embodiment, if the photosensitive value of the first region acquired in operation 202 relates to the photosensitive values acquired by the plurality of pixels satisfying the preset condition, the chip for biometric characteristic acquisition may average the photosensitive values acquired by the plurality of pixels satisfying the preset condition to obtain a pixel average value of the first region, and use the pixel average value as the photosensitive value of the first region. Then, T2 is calculated according to the pixel average value, T1, 'Target,' and the linear relationship shown in FIG. 6. The average value of the photosensitive values acquired by the plurality of pixels is used as the photosensitive value of the first region, so that interference caused by inaccuracy of photosensitive values acquired by several pixels is reduced, and the photosensitive value of the determined first region is more accurate and reasonable, thereby improving the accuracy of the calculated T2.

In operation 204, the acquisition of the biometric image according to the second exposure duration may be understood as: the chip for biometric characteristic acquisition exposes the photosensitive region of the chip for biometric characteristic acquisition during T2, acquires the photosensitive value of the photosensitive region, and acquires the biometric image based on the photosensitive value.

The method for biometric characteristic acquisition in this embodiment may be understood as adopting an auto exposure control (AEC) manner in which a value of the first exposure duration is small. Therefore, when it is determined that biometric recognition or registration is required, the first region is automatically short-exposed according to the configuration parameters, the photosensitive value of the first region is acquired, and then the second exposure duration T2 is determined by linear fitting in combination with the linear relationship between the photosensitive value and the exposure duration. The chip for biometric characteristic acquisition is configured to expose the photosensitive region during T2 to acquire the biometric image. Because the second exposure duration is determined by short exposure to the local region under the current environment, the second exposure duration is able to adapt to the change of the external environment, so that the adaptability of the chip for biometric characteristic acquisition to the external environment becomes better, the influence of the change of the external environment on the acquisition performance is reduced, thereby improving the accuracy of subsequent biometric recognition or registration.

In one embodiment, the configuration parameters include a filtering coefficient in addition to the first exposure duration, the first region, the target photosensitive value, and the reference information. After acquiring, according to the reference information, the photosensitive value acquired by the at least one second type pixel in the first region, except for the at least one first type pixel, the method further includes the following operations. That is, a filling photosensitive value is taken as the photosensitive value acquired by the at least one first type pixel, the filling photosensitive value including a photosensitive value acquired by at least one second type pixel around the at least one first type pixel, and the photosensitive value acquired by the at least one first type pixel and the photosensitive value acquired by the at least one second type pixel are filtered according to the filtering coefficient to obtain a filtered photosensitive value. The operation of determining the second exposure duration required to acquire the target photosensitive value in the photosensitive region according to the photosensitive value of the first region and the first exposure duration further includes the following operation, i.e., the second exposure duration required to acquire the target photosensitive value in the photosensitive region is determined according to the filtered photosensitive value and the first exposure duration. A flowchart of a method for biometric characteristic acquisition in this embodiment includes the following operations.

In 701, the plurality of configuration parameters are acquired.

In 702, at least one first type pixel belonging to a bad point in the first region is determined according to the reference information.

In 703, the first region is exposed according to the first exposure duration, and the photosensitive value acquired by the at least one second type pixel in the first region, except for the at least one first type pixel, is acquired.

In 704, a filling photosensitive value is taken as the photosensitive value acquired by the at least one first type pixel, where the filling photosensitive value includes a photosensitive value acquired by at least one second type pixel around the at least one first type pixel.

In 705, the photosensitive value acquired by the at least one first type pixel and the photosensitive value acquired by the at least one second type pixel are filtered according to the filtering coefficient to obtain a filtered photosensitive value.

In 706, the second exposure duration required to acquire the target photosensitive value in the photosensitive region is determined according to the filtered photosensitive value and the first exposure duration.

In 707, the biometric image is acquired according to the second exposure duration.

The operation 701 is similar to operation 201, and the main difference is that the configuration parameters in operation 701 includes, in addition to the first exposure duration, the first region and the target photosensitive value, reference information for determining at least one first type pixel belonging to the bad point in the first region and a filtering coefficient. The reference information has been described above and is not repeated herein. The filtering coefficient may be set by a person skilled in the art according to actual needs.

In one embodiment, the chip for biometric characteristic acquisition is disposed below the screen, and the filtering coefficient is determined according to the structure of the screen. The structure of the screen includes a soft screen or a hard screen, and the filtering coefficient determined based on the hard screen is greater than the filtering coefficient determined based on the soft screen. Through research, the inventor found that the influence degrees of different screen structures on the photosensitive value acquired by the pixel are different, i.e., the biometric image has a difference in forming upward burrs on different screen structures. Therefore, in this embodiment, the filtering coefficient determined according to the screen structure is more target, and the photosensitive value is able to be filtered more reasonably, so that the influence of different screen structures on the photosensitive value acquired by the pixel is reduced, which further improves the accuracy of the determined second exposure duration.

Optionally, there is also a difference in the degree of influence of different assembly tolerances at the time of assembly of the chip for biometric characteristic acquisition on the photosensitive value acquired by the pixel. Therefore, in this embodiment, the filtering coefficient may be determined according to the structure of the screen and the assembly tolerance of the chip for biometric characteristic acquisition, so that the photosensitive value is able to be filtered with a more reasonable filtering coefficient, thereby minimizing the influence of different screen structures and assembly tolerances on the photosensitive value acquired by the pixel, and further improving the accuracy of the determined second exposure duration. The assembly tolerance mainly reflects an error of an object distance P of the lens and/or an error of an image distance Q after the assembly of the chip for biometric characteristic acquisition and the lens. The error of the object distance P may be understood as the difference between the object distance P after the assembly and a preset standard object distance, and the error of the image distance Q may be understood as the difference between the image distance Q after the assembly and a preset standard image distance. When the error of the object distance P and/or the error of the image distance Q are/is large, the burr is also aggravated, and a large filtering coefficient is required to filter the burr. That is, the larger the assembly tolerance, the larger the determined filtering coefficient, thereby filtering the burr. In a specific implementation, the filtering coefficients may be dynamically adjusted according to the actual needs to achieve a better filtering level. The preset standard object distance and the preset standard image distance may be set according to actual needs, which is not specifically limited in this embodiment.

In operation 702, if the reference information includes the mark information of each pixel in the first region, and the mark information includes the first mark information for indicating that the pixel belongs to the bad point and the second mark information for indicating that the pixel does not belong to the bad point, then the at least one first type pixel belonging to the bad point in the first region determined by the chip for biometric characteristic acquisition according to the reference information includes at least one pixel marked with the first mark information. If the reference information includes the coordinate information of the bad block region determined based on the at least one first type pixel belonging to the bad point, the at least one first type pixel belonging to the bad point in the first region determined by the chip for biometric characteristic acquisition according to the reference information includes at least one pixel in the bad block region.

In operation 703, the chip for biometric characteristic acquisition exposes the first region according to the first exposure duration, and acquires the photosensitive value acquired by the at least one second type pixel in the first region, except for the at least one first type pixel, i.e., acquires the photosensitive value acquired by the normal pixel in the first region.

In operation 704, the chip for biometric characteristic acquisition may fill the at least one first type pixel with the photosensitive value acquired by at least one second type pixel around the at least one first type pixel, i.e., fill the bad point with the photosensitive value acquired by the normal pixel around the bad point, and set the photosensitive value acquired by the pixel belonging to the bad point to the photosensitive value acquired by the normal pixel around the bad point. The normal pixel around the bad point may be the normal pixel closest to the position of the bad point.

In operation 705, the chip for biometric characteristic acquisition filters the photosensitive value acquired by the at least one first type pixel and the photosensitive value acquired by the at least one second type pixel according to the filtering coefficient to obtain the filtered photosensitive value. That is, the chip for biometric characteristic acquisition filters the photosensitive values acquired by all the pixels in the first region to obtain the filtered photosensitive values. During filtering, filtering modes may be adopted as median filtering, Gaussian low-pass filtering, etc, which however is not specifically limited in this embodiment, and other filtering modes may be adopted in specific implementation.

In this embodiment, the photosensitive value acquired by the at least one first type pixel (i.e., the bad point) is replaced with the photosensitive value acquired by the normal pixel around the bad point, which facilitates the overall filtering of the photosensitive values of all the pixels in the first region according to the filtering coefficient, so as to avoid sudden change of the photosensitive value caused by direct filtering in which the bad point is removed without filling. The filtered photosensitive value more embodies real perception of the pixel to the optical signal from the external, and the second exposure duration determined in combination with the filtered photosensitive value is able to more adapt to the change of the external environment, so that the adaptability of the chip for biometric characteristic acquisition to the external environment is improved, the influence of the change of the external environment on the acquisition performance is reduced, thereby improving the accuracy of the subsequent biometric recognition or registration. For the under-screen fingerprint acquisition, the above optical signal from the external may be understood as fingerprint detection light carrying the fingerprint information formed by excitation light for fingerprint acquisition is irradiated onto the finger above the screen and scattered, reflected or transmitted by the finger.

In operation 706, the operation of determining the second exposure duration required to acquire the target photosensitive value in the photosensitive region according to the filtered photosensitive value and the first exposure duration includes the following operations. That is, the filtered photosensitive values of each pixel in the first region are averaged to obtain a pixel average value of the first region, and the pixel average value used as the photosensitive value of the first region. Then, T2 is calculated according to the pixel average value, T1, 'Target,' and the linear relationship shown in FIG. 6.

Figure 8:
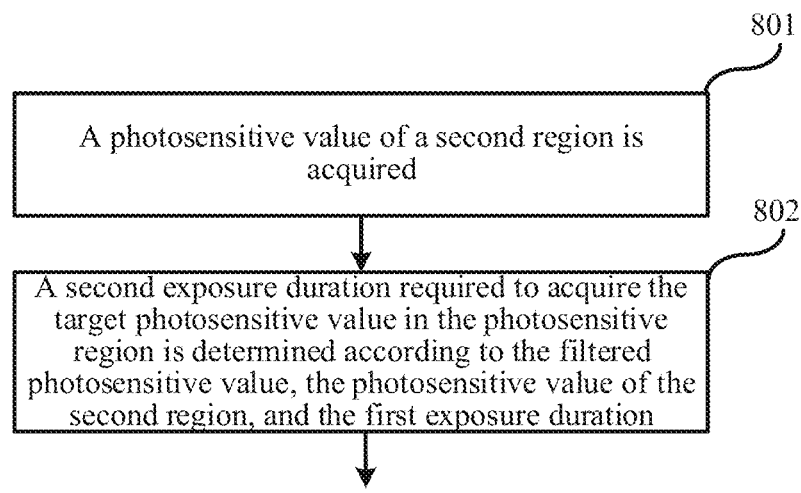
FIG. 8 is a flowchart of an implementation of operation 706 according to an embodiment of the present disclosure.

In one embodiment, an implementation of operation 706 is shown in FIG. 8, which includes the following operations.

In 801, a photosensitive value of a second region is acquired.

In 802, a second exposure duration required to acquire the target photosensitive value in the photosensitive region is determined according to the filtered photosensitive value, the photosensitive value of the second region, and the first exposure duration.

Figure 9:
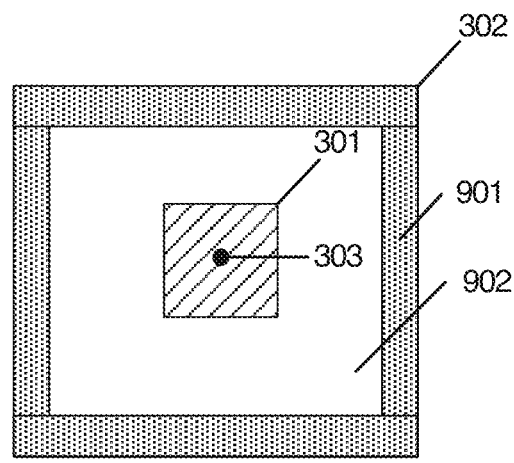
FIG. 9 is a schematic diagram of distribution of the first region and a second region in the photosensitive region according to an embodiment of the present disclosure.

The second region includes an edge region of the photosensitive region, the edge region includes a region for detecting circuit noise of the chip for biometric characteristic acquisition, and the second region does not overlap the first region. The circuit noise may be understood as noise of circuits in the chip for biometric characteristic acquisition, and the circuits in the chip for biometric characteristic acquisition may include a gain circuit, an analog-to-digital conversion circuit, and the like. A schematic diagram of distribution of the first region and the second region in the photosensitive region 302 is shown in FIG. 9, and the photosensitive region 302 in FIG. 9 includes the second region 901 located on the periphery of the photosensitive region 302 and a non-dark region 902 surrounded by the second region 901, and the first region 301 is located in the non-dark region 902.

The edge region of the photosensitive region of the chip for biometric characteristic acquisition may be shielded by a shielding material, which is difficult to perceive the external light. The shielding material may be metal, i.e., the edge region of the photosensitive region is covered with metal, and the region covered with metal may be referred to as the second region, or may be referred to as a Dark region, a metal-covered region, or a black-covered region. Since the pixels in the second region are covered with metal, the external light is not generally received. However, in the case of strong light, the strong light penetrates the metal covering the second region, making it possible for the pixels in the second region to receive some external light. The photosensitive value acquired by the pixel in the second region may be understood as a photosensitive value (called as a Dark value) acquired by the pixel when the pixel is not photosensitive under the current environment, so the Dark value may be used to indicate a reference value that the pixel is able to acquire in the absence of light, and the reference value may be used to indicate a magnitude of the circuit noise. In the presence of light, the photosensitive value acquired by the pixel minus the Dark value may indicate the photosensitive value actually acquired by the pixel after the reference value is removed, i.e., the photosensitive value actually acquired by the pixel after the circuit noise is removed. The photosensitive value after the reference value is removed eliminates the influence of the circuit noise and more accurately reflect the external optical signal perceived by the pixel.

In one embodiment, operation 801 may include acquiring a photosensitive value acquired by at least one pixel in a non-edge region of the second region. Through research, the inventor found that, although the pixel in the second region generally does not easily perceive the external light, it is still vulnerable to the strong light from the external, especially the pixel in the edge region of the second region are more likely to be disturbed by the strong light. Therefore, in this embodiment, when the photosensitive value of the second region is acquired, the photosensitive value acquired by the pixel in the non-edge region of the second region is acquired, so that the determined Dark value is able to eliminate the strong light interference from the external under the current environment and more accurately reflect the photosensitive value acquired by the pixel when the pixel is not photosensitive, thereby improving the accuracy of the determined second exposure duration.

In one embodiment, operation 801 may include acquiring the photosensitive value acquired by 'a' middle column(s) of pixels and 'a' middle row(s) of pixels in the second region, where 'a' is an integer greater than or equal to 1. For example, referring to FIG. 9, the second region 901 is distributed at the periphery of the photosensitive region 302, and the second region 901 may include a sub-region 1 at a left edge of the photosensitive region 302, a sub-region 2 at a right edge of the photosensitive region 302, a sub-region 3 at an upper edge of the photosensitive region 302, and a sub-region 4 at a lower edge of the photosensitive region 302. The 'a' middle column of pixels and/or the 'a' middle row of pixels in the second region may include any one or a combination of 'a' middle column(s) of pixels in the sub-region 1, 'a' middle column(s) of pixels in the sub-region 2, 'a' middle row(s) of pixels in the sub-region 3, and 'a' middle row(s) of pixels in the sub-region 4. For example, there are thirteen columns of pixels in the sub-region 1, and the 'a' middle columns of pixels in the sub-region 1 may be eight middle columns of pixels in the sub-region 1, where two columns of pixels at the left edge and three columns of pixels at the right edge of the sub-region 1 may be removed from the original thirteen columns of pixels to leave the eight middle columns of pixels. Then, the Dark value acquired by the eight middle columns of pixels in the sub-region 1 is acquired. The 'a' middle column(s) of pixels and/or the 'a' middle row(s) of pixels in the second region are farther from the edges of the second region itself, and the data are relatively centralized, so that the accuracy of the reference value, i.e., the Dark value, which is able to be acquired by the pixels in the absence of light is improved while avoiding the interference of the strong light, thereby improving the accuracy of the determined second exposure duration.

In operation 802, the filtered photosensitive value may be a filtered photosensitive value corresponding to each respective pixel in the first region. When the second exposure duration required to acquire the target photosensitive value in the photosensitive region is determined based on the filtered photosensitive value, the photosensitive value in the second region and the first exposure duration, one of the filtered photosensitive values corresponding to the pixels in the first region may be selected as 'Rawdata1', and one of the photosensitive values acquired by the pixels in the second region may be selected as 'Dark1', and then T2 is calculated based on 'Rawdata1', 'Dark1', T1, and 'Target.' For example, T2 is calculated by the following formula:

$$T2 = T1 * \frac{Rawdata1 - Dark1}{Target - Dark1}$$

The 'Rawdata1' may be selected in such a manner that the filtered photosensitive values corresponding to the pixels in the first region are sorted in ascending order, and one of the filtered photosensitive values is selected within a preset range as the 'Rawdata1' according to the order of the filtered photosensitive values. The preset range does not include filtered photosensitive values arranged in the first N bits, nor includes filtered photosensitive values arranged in the last N bits, where N is an integer greater than 1, and the specific value of N may be set by a person skilled in the art according to actual needs, which is not specifically limited in this embodiment. The 'Dark1' may also be selected in a similar manner, which is not repeated herein. Considering that all of the photosensitive values arranged in the first N bits and the filtered photosensitive values arranged in the last N bits may belong to the abnormal photosensitive values, selecting one photosensitive value within the preset range as the 'Rawdata1' avoids calculating T2 by the abnormal photosensitive value, which is conducive to improving the accuracy of the determined T2. In this embodiment, when T2 is calculated, a filtered photosensitive value 'Rawdata1' corresponding to a certain pixel in the first region and the 'Dark1' acquired by a certain pixel in the second region are selected, so that the data processing process is relatively simple, which is conducive to acquiring T2 quickly, thereby improving the recognition speed.

Figure 10:
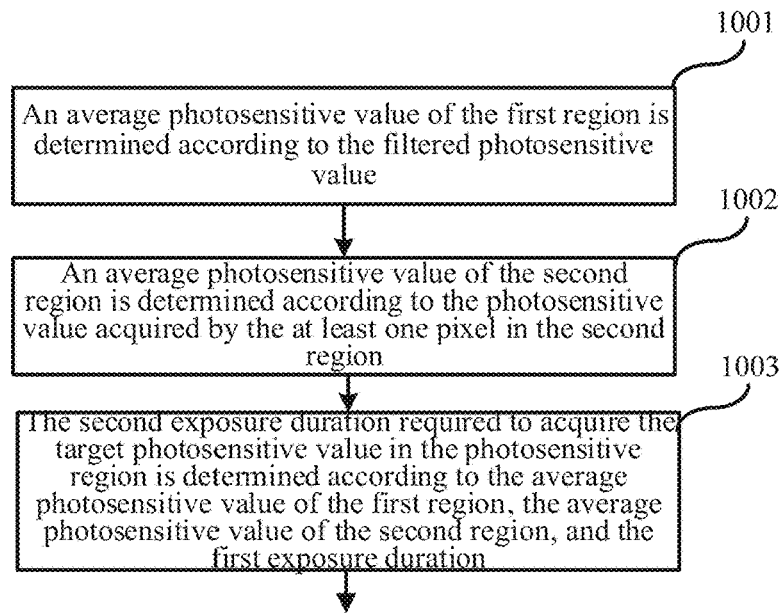
FIG. 10 is a flowchart of an implementation of operation 802 according to an embodiment of the present disclosure.

In one embodiment, an implementation of operation 802 is shown in FIG. 10, which includes the following operations.

In 1001, an average photosensitive value of the first region is determined according to the filtered photosensitive value.

In 1002, an average photosensitive value of the second region is determined according to the photosensitive value acquired by the at least one pixel in the second region.

In 1003, the second exposure duration required to acquire the target photosensitive value in the photosensitive region is determined according to the average photosensitive value of the first region, the average photosensitive value of the second region, and the first exposure duration.

In operation 1001, the chip for biometric characteristic acquisition may average the filtered photosensitive values corresponding to the pixels in the first region to obtain the average photosensitive value of the first region. Optionally, the chip for biometric characteristic acquisition may also sort the filtered photosensitive values corresponding to the pixels in the first region in ascending order, and average the filtered photosensitive values within the preset range to obtain the average photosensitive value of the first region. The preset range does not include filtered photosensitive values arranged in the first N bits, nor includes filtered photosensitive values arranged in the last N bits, where N is an integer greater than 1.

In operation 1002, the chip for biometric characteristic acquisition may average the photosensitive values acquired by the pixels in the second region to obtain the average photosensitive value of the second region. The photosensitive values acquired by the pixels in the second region may include a photosensitive value acquired by a pixel in a non-edge region of the second region. Alternatively, the photosensitive values acquired by the pixels in the second region may include 'a' middle columns of pixel(s) and/or 'a' middle rows of pixel(s) in the second region.

In operation 1003, the average photosensitive value of the first region is denoted as 'Rawmean', and the average photosensitive value of the second region is denoted as 'Darkmean', and the second exposure duration T2 may be calculated by the following formula:

$$T2 = T1 * \frac{Target - DarkMean}{Rawmean - DarkMean}$$

In this embodiment, the average photosensitive value of the first region may reflect the average level of the photosensitive values of the pixels after the bad point filling and the filtering, and the average photosensitive value of the second region may reflect the average level of the photosensitive values of the pixels in the second region, thereby reducing the interference caused by the inaccuracy of the photosensitive values of several pixels, and improving the accuracy of the calculated T2. Meanwhile, when calculating the 'Darkmean', the photosensitive value acquired by the pixel in the edge region of the Dark region may be eliminated, which is conducive to avoiding interference of the external strong light, and more accurately embodies the photosensitive value acquired by the pixel when the pixel is not photosensitive, thereby further improving the accuracy of the determined second exposure duration. Both the 'Target' and 'Rawmean' use 'Darkmean' for subtraction, which is conducive to eliminating the influence of the structure of the screen itself on the photographic value acquired by pixel under the current environment, so as to further improve the adaptability of the calculated T2 to the current environment, make the adaptability of the chip for biometric characteristic acquisition to the current environment better, and reduce the influence of the change of the external environment on the acquisition performance, thereby further improving the accuracy of the subsequent biometric recognition or registration.

In one embodiment, in addition to the first exposure duration, the first region, and the target photosensitive value, the configuration parameters mentioned in operation 201 or operation 701 further include an upper limit duration corresponding to the photosensitive region and/or a lower limit duration corresponding to the photosensitive region, and the operation 204 or 707 of acquiring the biometric image according to the second exposure duration includes the following operations, i.e., the biometric image is acquired according to the upper limit duration in response to the plurality of configuration parameters further including the upper limit duration and the second exposure duration being longer than the upper limit duration, and the biometric image is acquired according to the lower limit duration in response to the plurality of configuration parameters further including the lower limit duration and the second exposure duration being shorter than the lower limit duration.

The upper limit duration corresponding to the photosensitive region is denoted as T2_max, and the lower limit duration corresponding to the photosensitive region is denoted as T2_min. The T2_min and T2_max may be set by a person skilled in the art according to actual needs, in order to avoid excessive or too small exposure duration for the final biometric image acquisition, thereby ensuring that the biometric image finally acquired is relatively clear and convenient for recognition or registration. Through research, the inventor found that the calculated second exposure duration may be too small and too large in strong light environment, indoor environment, normal lighting of the spot and other abnormal conditions. Therefore, by setting the upper limit duration and/or the lower limit duration, the biometric image is acquired according to the upper limit duration when the second exposure duration is longer than the upper limit duration, and the biometric image is acquired according to the lower limit duration when the second exposure duration is less than the lower limit duration, which is conducive to avoiding the inaccuracy of the biometric image finally acquired due to the second exposure duration calculated in the abnormal conditions being too small or too large, thereby ensuring that the biometric image finally acquired is relatively clear and convenient for recognition or registration.

In one embodiment, the chip for biometric characteristic acquisition is disposed in the terminal, and the configuration parameters further include the upper limit duration corresponding to the photosensitive region and the lower limit duration corresponding to the photosensitive region. The upper limit duration and the lower limit duration satisfy the following relationship:

$$T2\_max=T0+T0*a1$$

$$T2\_min=T0-T0*a2.$$

T0 is a default exposure duration when the terminal leaves the factory, T2_max is the upper limit duration, T2_min is the lower limit duration, and a2 is greater than or equal to a1, where a2 and a1 may be set according to actual needs, for example, value ranges of a1 and a2 are as follows:

$$10\% \leq a1 \leq 30\%, \text{ and } 30\% \leq a2 \leq 50\%.$$

The default exposure duration when the terminal leaves the factory may be the default exposure duration set based on the calibration result of the complete machine when the terminal is in a complete-machine mass production phase. Through research, the inventor found that a probability and an amplitude of fluctuation of the second exposure duration in a direction beyond the default exposure duration are small, and the probability and the amplitude of the fluctuation of second exposure duration in a direction below the default exposure duration are large. Therefore, a2 is greater than or equal to a1, which is conducive to adapting to different fluctuation conditions that may exist in the second exposure duration.

For example, if the default exposure duration when the terminal leaves the factory is 50 ms, the T2_max may be selected between 55 ms (50+50*10%=55 ms) and 65 ms (50+50*30%=65 ms). T2_min may be selected between 30 ms (50-50*30%=35 ms) and 25 ms (50-50*50%=25 ms). Assuming that T2_max=65 ms, T2_min=35 ms, if T2 is greater than 65 ms, the biometric image is acquired with 65 ms as the exposure duration. If T2 is less than 35 ms, the biometric image is acquired with 35 ms as the exposure duration.

In one embodiment, the configuration parameters mentioned in operation 201 or operation 701 further include a pulse width modulation (PWM) dimming period of the screen. The operation 204 or 707 of acquiring the biometric image according to the second exposure duration includes the following operations, i.e., the second exposure duration is adjusted to an integer multiple of the PWM dimming period in response to the second exposure duration being not equal to the integer multiple of the PWM dimming period, and the biometric image is acquired according to the adjusted second exposure duration.

For example, the second exposure duration may be adjusted to the integer multiple of the PWM dimming period by the following formula:

$$T2'=(\text{uint8}(T2/T2\_pwm))*T2\_pwm.$$

T2' is the adjusted second exposure duration, T2 is the second exposure duration determined in operation 203 or operation 706, T2_pwm is the PWM dimming period of the screen, and 'uint8' represents a data type called the unsigned integer.

Figure 11:
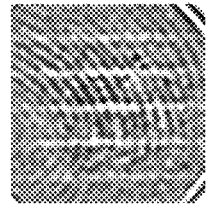
FIG. 11 is a schematic diagram of a stripe image according to an embodiment of the present disclosure.

In this embodiment, the inventor found that for a screen of a high drop ratio type, when the second exposure duration is not equal to the integer multiple of the PWM dimming period, the acquired biometric image may have a stripe, for example, the fingerprint image shown in FIG. 11 is a stripe image. Therefore, in this embodiment, the second exposure duration is adjusted to be the integer multiple of the PWM dimming period, and the biometric image is acquired with the adjusted second exposure duration, which is conducive to avoiding the occurrence of stripes in the biometric image acquired by the chip for biometric characteristic acquisition disposed below the screen of the high drop ratio type, thereby improving the accuracy of the acquired biometric image.

The brightness drop of the screen of the high drop ratio type satisfies any one of the following conditions: when dimming is performed using the PWM dimming mode, the brightness of the screen drops below 10% of the normal brightness of the screen between two PWM dimming periods. When dimming is performed using a DC dimming mode, the brightness of the screen drops below 10% of the normal brightness of the screen between frames. The normal brightness of the screen may be set according to actual needs, and the normal brightness of different screens may be different, which is not specifically limited in this embodiment. In a specific implementation, if the screen of the terminal belongs to a screen of the high drop ratio type, the PWM dimming period of the screen may be increased in the configuration parameters.

Figure 12:
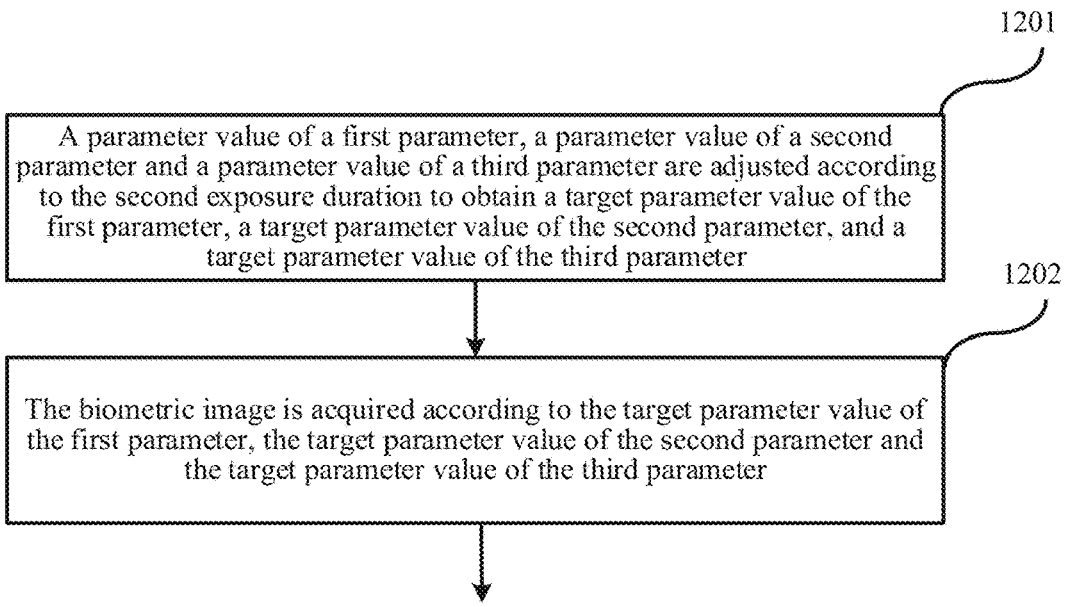
FIG. 12 is a flowchart of an implementation of acquiring a biometric image according to a second exposure duration according to an embodiment of the present disclosure.

In one embodiment, an implementation of acquiring the biometric image according to the second exposure duration is shown in FIG. 12, which includes the following operations.

In 1201, a parameter value of a first parameter, a parameter value of a second parameter and a parameter value of a third parameter are adjusted according to the second exposure duration to obtain a target parameter value of the first parameter, a target parameter value of the second parameter, and a target parameter value of the third parameter.

In 1202, the biometric image is acquired according to the target parameter value of the first parameter, the target parameter value of the second parameter and the target parameter value of the third parameter.

The first parameter includes a duration of a horizontal blanking phase, denoted as H_Blank. In the scanning process of converting the optical signal into the electrical signal, the scanning always starts from an upper left corner of the image and proceeds horizontally. When the scanning point reaches a right edge of the image, the scanning point quickly returns to the left, and scanning of a second line is restarted under a starting point of the first line. The returning process between the lines is called horizontal blanking or line blanking.

The second parameter the second parameter includes a duration of a vertical blanking phase, denoted V_Blank. A complete image scanning signal, consisting of horizontal blanking interval separated line signal sequence, is called a frame. After scanning a frame, the scanning point returns from a lower right corner of the image to the upper left corner of the image to start scanning a new frame. This time interval is called vertical blanking or field blanking.

The third parameter includes a delay duration for starting exposure of each row of pixels, denoted as V_Delay. The third parameter is how long each row of pixels is delayed to start exposure.

In operation 1201, the chip for biometric characteristic acquisition may determine a first scanning duration required to scan a single row of pixels and a second scanning duration required to scan a single pixel. Then, the parameter value of the first parameter is adjusted according to a first relationship to obtain the target parameter value of the first parameter, the parameter value of the second parameter and the parameter value of the third parameter are adjusted according to a second relationship to obtain the target parameter value of the second parameter and the target parameter value of the third parameter. The target parameter value of the first parameter conforms to the first relationship, and the first relationship is a relationship between the second scanning duration, the number of pixels per row in the pixel array, the parameter value of the first parameter, and the first scanning duration. The target parameter value of the second parameter and the target parameter value of the third parameter conform to the second relationship, and the second relationship is a relationship between the first scanning duration, a total number of rows in the pixel array, the parameter value of the second parameter, the parameter value of the third parameter, and the second exposure duration.

The first scanning duration required to scan a single row of pixels may be denoted as Row_time. First in first out (FIFO) queue storage capability and a serial peripheral interface (SPI) speed of the chip for biometric characteristic acquisition affects the length of the Row_time, and the SPI speed may limit the minimum value of the Row_time. A chip for biometric characteristic acquisition has a corresponding Row_time, which may be obtained through testing during parameter testing of the chip for biometric characteristic acquisition in the mass production phase and stored in the chip for biometric characteristic acquisition.

The second scanning duration required to scan a single pixel may be denoted as 1/pixel_clock, and pixel_clock is a clock period of the pixel. The pixel_clock may be obtained through testing during parameter testing of the chip for biometric characteristic acquisition in the mass production phase and stored in the chip for biometric characteristic acquisition. For example, pixel_clock=20 MHz, and 1/pixel_clock=50 ns.

The number of pixels per row in the pixel array is denoted as H_Valid, and the total number of rows in the pixel array is denoted as V_Valid. It should be appreciated that for a determined chip for biometric characteristic acquisition, H_Valid and V_Valid in the chip for biometric characteristic acquisition are determined.

The first relationship may be expressed as follows:

Row_time=($H\_Blank$+$H\_Valid$)*(1/pixel_clock)

The second relationship may be expressed as follows:

$T2 \approx ((V\_Blank+V\_Valid)-V\_Delay)*Row\_time$

It should be understood that H_Valid, V_Valid, 1/pixel_clock, Row_time, and T2 in the first relationship and the second relationship are determined values, and H_Blank, V_Blank, and V_Delay are three parameter values to be adjusted.

In a specific implementation, H_Blank may be adjusted by the first relationship, so that a target parameter value of the first parameter that conforms to the first relationship is finally obtained, and the parameter value that enables the first relationship to be valid is finally used as the target parameter value of the adjusted first parameter.

In a specific implementation, V_Blank and V_Delay may be adjusted by the second relationship, so that a target parameter value of the second parameter and a target parameter value of the third parameter that conform to the second relationship are finally obtained, and the two parameter values that enable the second relationship to be valid are finally used as the target parameter value of the adjusted second parameter and the target parameter value of the adjusted third parameter. Since there are two parameters V_Blank and V_Delay as variables in the second relationship, one variable may be fixed first, and the other variable may be adjusted. When the adjustment of the other variable is unable to make the calculation result to be close to T2, the previously fixed variable may be adjusted, and the two variables may be mutually adjusted to finally obtain two target parameter values that enable the second relationship to be valid.

In one embodiment, the configuration parameters further include a lower limit parameter value of the first parameter. The operation of adjusting the parameter value of the first parameter according to the first relationship to obtain the target parameter value of the first parameter includes the following operation, i.e., in the process of adjusting the parameter value of the first parameter according to the first relationship, the lower limit parameter value is taken as the target parameter value of the first parameter in response to the parameter value of the first parameter being unable to conform to the first relationship when the parameter value of the first parameter is adjusted to the lower limit parameter value. The lower limit parameter value of the first parameter may be denoted as H_Blank_min, and H_Blank_min may be determined based on the minimum value of Row_time. The smaller the minimum value of Row_time, the smaller H_Blank_min. The larger the minimum value of Row_time, and the larger H_Blank_min. That is, in this embodiment, if H_Blank is already equal to H_Blank_min in the process of adjusting H_Blank and the first relationship is still unable to be valid, H_Blank_min may be directly used as the target parameter value of the finally adjusted first parameter, i.e., the minimum target parameter value of the first parameter is H_Blank_min. The parameter value of the first parameter directly affects the first scanning duration Row_time consumed by scanning a single row of pixels, and Row_time affects normal output of the photosensitive value. Therefore, setting the lower limit parameter value of the first parameter is conducive to ensuring that the normal output of the photosensitive value is not affected while adjusting the first parameter.

In one embodiment, in the process of adjusting the parameter values of H_Blank, V_Blank, and V_Delay, H_Blank may be directly adjusted to H_Blank_min in the configuration parameters. First, V_Delay is fixed to zero, V_Blank is adjusted until the second relationship is unable to be valid through the adjustment of V_Blank, and then the V_Delay is adjusted. This kind of adjustment is conducive to reducing the adjustment complexity, accelerating the adjustment speed, thereby accelerating the speed of acquiring the biometric image, and accelerating the speed of subsequent biometric recognition or registration.

When the target parameter value of the first parameter, the target parameter value of the second parameter and the target parameter value of the third parameter are obtained after the adjustment, the target parameter values of the three parameters may be set in the chip for biometric characteristic acquisition, so that the exposure duration finally presented by the chip for biometric characteristic acquisition when acquiring the biometric image is T2.

Figure 13:
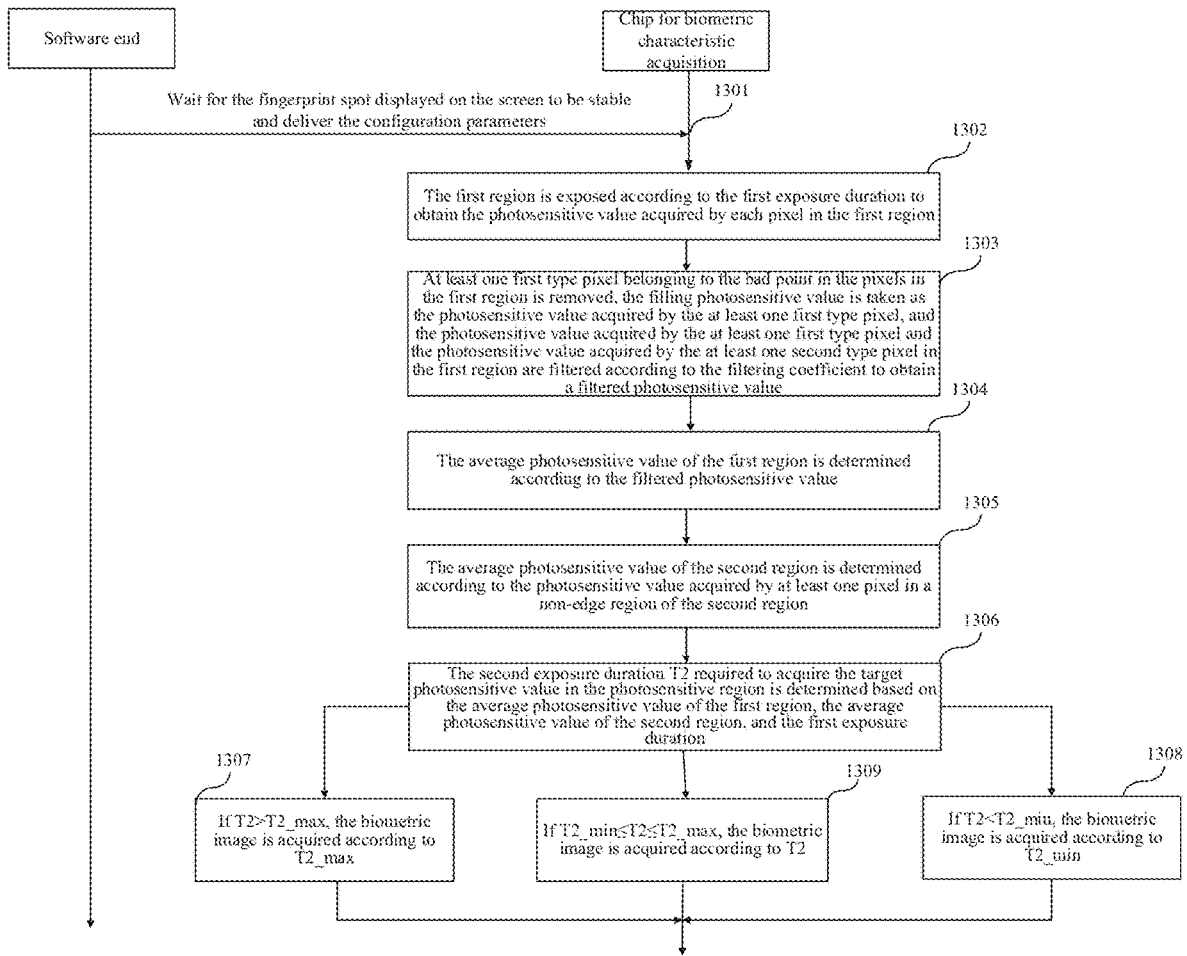
FIG. 13 is a flowchart of a method for biometric characteristic acquisition applied at an under-screen fingerprint acquisition chip according to an embodiment of the present disclosure.

In one embodiment, the chip for biometric characteristic acquisition is an under-screen fingerprint acquisition chip, and a flowchart of a method for biometric characteristic acquisition applied at the under-screen fingerprint acquisition chip is shown in FIG. 13, which includes the following operations.

In 1301, the software end waits for the fingerprint spot displayed on the screen to be stable, and then delivers the configuration parameters to the chip for biometric characteristic acquisition.

The software end waiting for the fingerprint light spot displayed on the screen to stable is understood as: after determining that the fingerprint spot displayed on the screen is pressed, the software end waits for a preset duration that is greater than or equal to a minimum duration required for the fingerprint spot from starting being lit to become stable. After waiting for the preset duration, the software end defaults the fingerprint light spot to be stable, and the software end delivers the configuration parameters to the chip for biometric characteristic acquisition.

The configuration parameters include the first exposure duration T1, the first region, the target photosensitive value 'Target', the reference information, the filtering coefficient, the upper limit duration T2_max corresponding to the photosensitive region, the lower limit duration T2_min corresponding to the photosensitive region, and the lower limit parameter value H_Blank_min of the first parameter. If the screen is a high drop ratio screen, the configuration parameters also include the PWM dimming period of the screen.

In 1302, the first region is exposed according to the first exposure duration to obtain the photosensitive value acquired by each pixel in the first region.

In 1303, at least one first type pixel belonging to the bad point in the pixels in the first region is removed, the filling photosensitive value is taken as the photosensitive value acquired by the at least one first type pixel, and the photosensitive value acquired by the at least one first type pixel and the photosensitive value acquired by the at least one second type pixel in the first region are filtered according to the filtering coefficient to obtain a filtered photosensitive value.

The filling photosensitive value includes a first photosensitive value acquired by at least one second type pixel located around the at least one first type pixel.

In 1304, the average photosensitive value of the first region is determined according to the filtered photosensitive value.

In 1305, the average photosensitive value of the second region is determined according to the photosensitive value acquired by at least one pixel in a non-edge region of the second region.

In 1306, the second exposure duration T2 required to acquire the target photosensitive value in the photosensitive region is determined based on the average photosensitive value of the first region, the average photosensitive value of the second region, and the first exposure duration.

In 1307, if T2>T2_max, the biometric image is acquired according to T2_max.

In 1308, if T2<T_min, the biometric image is acquired according to T2_min.

In 1309, if T2_min≤T2≤T2_max, the biometric image is acquired according to T2.

In operation 1307, the sub-screen fingerprint acquisition chip may adjust the three parameters H_Blank, V_Blank and V_Delay according to T2_max. The second relationship used in the adjustment may be expressed as follows:

$$T2\_max((V\_Blank+V\_Valid)-V\_Delay)*Row\_time.$$

In operation 1308, the under-screen fingerprint acquisition chip may adjust the three parameters H_Blank, V_Blank and V_Delay according to the T2_min. The second relationship used in the adjustment may be expressed as follows:

$$T2\_min((V\_Blank+V\_Valid)-V\_Delay)*Row\_time.$$

Finally, the under-screen fingerprint acquisition chip is able to acquire the biometric image according to the adjusted three parameters. The minimum of H_Blank may be adjusted to H_Blank_min.

The method for biometric characteristic acquisition applied at the under-screen fingerprint acquisition chip in this embodiment improves the adaptability of the under-screen fingerprint acquisition chip to the fingerprint spot and reduces the influence of the fluctuation of the fingerprint spot on the fingerprint acquisition performance, thereby improving the accuracy of the fingerprint recognition or registration.

For the sake of clarity of description, the operations of the above methods may be combined into one operation or a certain operation may be split into multiple operations, which are within the protection scope of the present disclosure as long as they include the same logical relationship. Irrelevant modifications added in or irrelevant designs introduced to the algorithm or process, but not changing the core design of the algorithm and process, are within the protection scope of the present disclosure.

Figure 14:
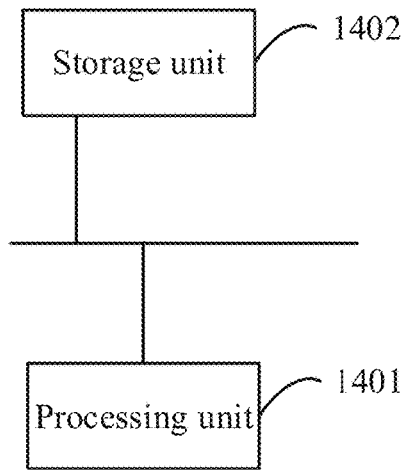
FIG. 14 is a schematic structural diagram of a chip for biometric characteristic acquisition according to an embodiment of the present disclosure.

An embodiment of the present disclosure further relates to a chip for biometric characteristic acquisition, as shown in FIG. 14, which includes a processing unit 1401 and a storage unit 1402 connected to the processing unit 1401. The storage unit 1402 stores instructions executable by the processing unit 1401, and the instructions are executed by the processing unit 1401 to enable the processing unit 1401 to perform the method for biometric characteristic acquisition according to any one of the above embodiments.

An embodiment of the present disclosure further relates to a terminal including the chip for biometric characteristic acquisition as shown in FIG. 14.

An embodiment of the present disclosure further relates to a computer readable storage medium storing a computer program. The computer program is executed by a processor to enable the processor to perform the method embodiments described above.

That is, it should be understood by those skilled in the art that all or a portion of the operations of the method embodiments described above may be implemented by a program instructing relevant hardware. The program is stored in a storage medium, including several instructions to cause a device (which may be a single chip microcomputer, a chip, or the like) or a processor to perform all or a portion of the operations of the method embodiments described herein. The above storage medium includes various medium capable of storing program code, such as a USB flash drive, a removable hard disk, a read-only memory (ROM), a random access memory (RAM), a magnetic disk, an optical disk, or the like.

Those of ordinary skill in the art should understand that the embodiments described above are specific embodiments of the present disclosure, and in practical application, various changes may be made to these embodiments in form and detail without departing from the spirit and scope of the present disclosure.

What is claimed is:

1. A method for biometric characteristic acquisition, applied at a chip for biometric characteristic acquisition, comprising:
   acquiring a plurality of configuration parameters, wherein the plurality of configuration parameters include a first exposure duration, and parameters defining a first region and a target photosensitive value, wherein the first region is a local region in a photosensitive region of the chip for biometric characteristic acquisition;
exposing the first region according to the first exposure duration, and acquiring a photosensitive value of the first region;
determining a second exposure duration required to acquire the target photosensitive value in the photosensitive region according to the photosensitive value of the first region and the first exposure duration; and
acquiring a biometric image according to the second exposure duration;
wherein the plurality of configuration parameters further include one or both of an upper limit duration corresponding to the photosensitive region and a lower limit duration corresponding to the photosensitive region, and the upper limit duration and the lower limit duration satisfy the following relationship:

$$T2\_max=T0+T0*a1$$

$$T2\_min=T0-T0*a2,$$

wherein T0 is a default exposure duration when the terminal leaves a factory, T2 max is the upper limit duration, T2 min is the lower limit duration, a2 is greater than or equal to a1, and values of a1 and a2 range as follows:

$$10\% \leq a1 \leq 30\%, \text{ and } 30\% \leq a2 \leq 50\%; \text{ and}$$

wherein acquiring the biometric image according to the second exposure duration comprises:
acquiring the biometric image according to the upper limit duration in response to the plurality of configuration parameters further including the upper limit duration and the second exposure duration being longer than the upper limit duration; and
acquiring the biometric image according to the lower limit duration in response to the plurality of configuration parameters further including the lower limit duration and the second exposure duration being shorter than the lower limit duration.

2. The method for biometric characteristic acquisition according to claim 1, wherein the chip for biometric characteristic acquisition is disposed in a terminal, and acquiring the plurality of configuration parameters comprises:
receiving the plurality of configuration parameters delivered by an application software in the terminal.

3. The method for biometric characteristic acquisition according to claim 1, wherein acquiring the plurality of configuration parameters comprises:
acquiring the plurality of configuration parameters in response to detecting a preset trigger condition, wherein the preset trigger condition includes requiring one or both of biometric registration and biometric recognition.

4. The method for biometric characteristic acquisition according to claim 3, wherein exposing the first region according to the first exposure duration, and acquiring the photosensitive value of the first region comprises:
in response to detecting the preset trigger condition, exposing the first region according to the first exposure duration after an interval of a preset duration, and acquiring the photosensitive value of the first region.

5. The method for biometric characteristic acquisition according to claim 4, wherein the chip for biometric characteristic acquisition is an under-screen fingerprint acquisition chip, and requiring one or both of the biometric registration and the biometric recognition comprises: detecting that a region where a fingerprint spot is located on a screen is pressed, wherein the preset duration is greater than or equal to a minimum duration required for the fingerprint spot from starting being lit to become stable.

6. The method for biometric characteristic acquisition according to claim 1, wherein the plurality of configuration parameters further include reference information for determining at least one first type pixel belonging to a bad point in the first region, and acquiring the photosensitive value of the first region comprises:
acquiring, according to the reference information, the photosensitive value acquired by at least one second type pixel in the first region, except for the at least one first type pixel.

7. The method for biometric characteristic acquisition according to claim 6, wherein the reference information includes mark information of each pixel in the first region, and the mark information includes first mark information for indicating that the pixel belongs to the bad point and second mark information for indicating that the pixel does not belong to the bad point;
optionally, the reference information includes coordinate information of a bad block region determined based on the at least one first type pixel belonging to the bad point.

8. The method for biometric characteristic acquisition according to claim 6, wherein the plurality of configuration parameters further include a filtering coefficient, and after acquiring, according to the reference information, the photosensitive value acquired by the at least one second type pixel in the first region, except for the at least one first type pixel, the method further comprises:
taking a filling photosensitive value as the photosensitive value acquired by the at least one first type pixel, wherein the filling photosensitive value includes a photosensitive value acquired by at least one second type pixel around the at least one first type pixel; and
filtering the photosensitive value acquired by the at least one first type pixel and the photosensitive value acquired by the at least one second type pixel according to the filtering coefficient to obtain a filtered photosensitive value;
and wherein determining the second exposure duration required to acquire the target photosensitive value in the photosensitive region according to the photosensitive value of the first region and the first exposure duration comprises:
determining the second exposure duration required to acquire the target photosensitive value in the photosensitive region according to the filtered photosensitive value and the first exposure duration.

9. The method for biometric characteristic acquisition according to claim 8, wherein determining the second exposure duration required to acquire the target photosensitive value in the photosensitive region according to the filtered photosensitive value and the first exposure duration comprises:
acquiring a photosensitive value of a second region, wherein the second region includes an edge region of the photosensitive region, the second region does not overlap the first region, and the edge region includes a region configured to detect circuit noise of the chip for biometric characteristic acquisition; and
determining the second exposure duration required to acquire the target photosensitive value in the photosensitive region according to the filtered photosensitive value, the photosensitive value of the second region, and the first exposure duration.

10. The method for biometric characteristic acquisition according to claim 9, wherein acquiring the photosensitive value of the second region comprises:
    acquiring the photosensitive value acquired by one of the following:
        at least one pixel in a non-edge region of the second region; and
        one or both of a middle column of pixels and a middle row of pixels in the second region, wherein a is an integer greater than or equal to 1.

11. The method for biometric characteristic acquisition according to claim 9, wherein determining the second exposure duration required to acquire the target photosensitive value in the photosensitive region according to the filtered photosensitive value, the photosensitive value of the second region, and the first exposure duration comprises:
    determining an average photosensitive value of the first region according to the filtered photosensitive value;
    determining an average photosensitive value of the second region according to the photosensitive value acquired by the at least one pixel in the second region; and
    determining the second exposure duration required to acquire the target photosensitive value in the photosensitive region according to the average photosensitive value of the first region, the average photosensitive value of the second region, and the first exposure duration, including:
    calculating the second exposure duration by the following formula:

$$T2 = T1 * \frac{\text{Target} - DarkMean}{Rawmean - DarkMean},$$

wherein T2 is the second exposure duration, T1 is the first exposure duration, Target is the target photosensitive value, Rawmean is the average photosensitive value of the first region, and Darkmean is the average photosensitive value of the second region.

12. The method for biometric characteristic acquisition according to claim 8, wherein the chip for biometric characteristic acquisition is disposed below the screen, and the filtering coefficient is determined according to a structure of the screen; and wherein the structure of the screen includes one of a soft screen and a hard screen, and a filtering coefficient determined based on the hard screen is greater than a filtering coefficient determined based on the soft screen.

13. The method for biometric characteristic acquisition according to claim 1, wherein the chip for biometric characteristic acquisition is disposed below a screen, and the plurality of configuration parameters further include a pulse width modulation (PWM) dimming period of the screen;
    wherein acquiring the biometric image according to the second exposure duration comprises:
    adjusting the second exposure duration to an integer multiple of the PWM dimming period in response to the second exposure duration being not equal to the integer multiple of the PWM dimming period; and
    acquiring the biometric image according to the adjusted second exposure duration.

14. The method for biometric characteristic acquisition according to claim 1, wherein the first exposure duration is determined according to a linearity of the chip for biometric characteristic acquisition, and the smaller the linearity, the smaller the determined first exposure duration; and wherein the first exposure duration is greater than 0 ms, and is less than or equal to 10 ms.

15. The method for biometric characteristic acquisition according to claim 1, wherein the chip for biometric characteristic acquisition is disposed below a screen, and the target photosensitive value is determined based on a gain value corresponding to a structure of the screen; wherein the structure of the screen includes one of a soft screen and a hard screen, and a gain value corresponding to the soft screen is greater than a gain value corresponding to the hard screen; and wherein an area of the first region is determined according to a structure of the screen, and an area of the first region determined based on the soft screen is larger than an area of the first region determined based on the hard screen.

16. The method for biometric characteristic acquisition according to claim 1, wherein a center of the first region includes a condensing center of the photosensitive region; and wherein a number of pixels in the first region is an integer multiple of a number of pixels required to be readout in a mode of one pixel, determined based on an image readout mode binning of the chip for biometric characteristic acquisition.

17. The method for biometric characteristic acquisition according to claim 1, wherein the chip for biometric characteristic acquisition comprises a pixel array having a plurality of pixels, and acquiring the biometric image according to the second exposure duration comprises:
    adjusting a parameter value of a first parameter, a parameter value of a second parameter and a parameter value of a third parameter according to the second exposure duration to obtain a target parameter value of the first parameter, a target parameter value of the second parameter, and a target parameter value of the third parameter, wherein the first parameter includes a duration of a horizontal blanking phase, the second parameter includes a duration of a vertical blanking phase, and the third parameter includes a delay duration for starting exposure of each row of pixels; and
    acquiring the biometric image according to the target parameter value of the first parameter, the target parameter value of the second parameter and the target parameter value of the third parameter.

18. A chip for biometric characteristic acquisition, comprising: a processing unit and a storage unit connected to the processing unit, wherein the storage unit stores instructions executable by the processing unit, and the instructions are executed by the processing unit to enable the processing unit to perform a method for biometric characteristic acquisition, wherein the method comprises:
    acquiring a plurality of configuration parameters, wherein the plurality of configuration parameters include a first exposure duration, parameters defining a first region and a target photosensitive value, wherein the first region is a local region in a photosensitive region of the chip for biometric characteristic acquisition;
    exposing the first region according to the first exposure duration, and acquiring a photosensitive value of the first region;
    determining a second exposure duration required to acquire the target photosensitive value in the photosensitive region according to the photosensitive value of the first region and the first exposure duration; and
    acquiring a biometric image according to the second exposure duration;
    wherein the plurality of configuration parameters further include one or both of an upper limit duration corresponding to the photosensitive region and a lower limit duration corresponding to the photosensitive region, and the upper limit duration and the lower limit duration satisfy the following relationship:

$$T2\_max = T0 + T0*a1$$

$$T2\_min = T0 - T0*a2,$$

wherein T0 is a default exposure duration when the terminal leaves a factory, T2 max is the upper limit duration, T2 min is the lower limit duration, a2 is greater than or equal to a1, and values of a1 and a2 range as follows:

$$10\% \leq a1 \leq 30\%, \text{ and } 30\% \leq a2 \leq 50\%; \text{ and}$$

wherein acquiring the biometric image according to the second exposure duration comprises:

acquiring the biometric imam according to the upper limit duration in response to the plurality of configuration parameters further including the upper limit duration and the second exposure duration being longer than the upper limit duration; and acquiring the biometric imam according to the lower limit duration in response to the plurality of configuration parameters further including the lower limit duration and the second exposure duration being shorter than the lower limit duration.

19. A terminal comprising a chip for biometric characteristic acquisition, the chip comprising a processing unit and a storage unit connected to the processing unit, wherein the storage unit stores instructions executable by the processing unit, and the instructions are executed by the processing unit to enable the processing unit to perform a method for biometric characteristic acquisition, wherein the method comprises:

acquiring a plurality of configuration parameters, wherein the plurality of configuration parameters include a first exposure duration, parameters defining a first region and a target photosensitive value, wherein the first region is a local region in a photosensitive region of the chip for biometric characteristic acquisition;

exposing the first region according to the first exposure duration, and acquiring a photosensitive value of the first region;

determining a second exposure duration required to acquire the target photosensitive value in the photosensitive region according to the photosensitive value of the first region and the first exposure duration; and acquiring a biometric image according to the second exposure duration;

wherein the plurality of configuration parameters further include one or both of an upper limit duration corresponding to the photosensitive region and a lower limit duration corresponding to the photosensitive region, and the upper limit duration and the lower limit duration satisfy the following relationship:

$$T2\_max = T0 + T0*a1$$

$$T2\_min = T0 - T0*a2,$$

wherein T0 is a default exposure duration when the terminal leaves a factory, T2 max is the upper limit duration, T2 min is the lower limit duration, a2 is greater than or equal to a1, and values of a1 and a2 range as follows:

$$10\% \leq a1 \leq 30\%, \text{ and } 30\% \leq a2 \leq 50\%; \text{ and}$$

wherein acquiring the biometric image according to the second exposure duration comprises:

acquiring the biometric image according to the upper limit duration in response to the plurality of configuration parameters further including the upper limit duration and the second exposure duration being longer than the upper limit duration; and acquiring the biometric image according to the lower limit duration in response to the plurality of configuration parameters further including the lower limit duration and the second exposure duration being shorter than the lower limit duration.

* * * * *